US012755250B2

(12) United States Patent
Hubbs et al.

(10) Patent No.: US 12,755,250 B2
(45) Date of Patent: Oct. 6, 2026

(54) USING ARTIFICIAL INTELLIGENCE MODELS TO IDENTIFY A PRODUCER AND CONSUMER MATCH

(71) Applicant: Sequoia Benefits and Insurance Services, LLC, San Mateo, CA (US)

(72) Inventors: Joseph David Hubbs, Brooklyn, NY (US); Dustin Steven Schodt, Gilbert, AZ (US); Ruth Buel, Sunnyvale, CA (US); Dennis Dale Warner, Jr., Wesley Chapel, FL (US); Sean Beckstead, San Mateo, CA (US); Martina Lendova Huamonte, Aldie, VA (US); Fran Glaser, Matawan, NJ (US); Eric Stephen Sankner, Downingtown, PA (US); Maya Louise Estrada, Richmond, CA (US); David Aaron Finkelstein, Phoenix, AZ (US); Laura Katharina Bergner, San Francisco, CA (US); Marissa Kelly Lyons, Walnut Creek, CA (US); Mark Dunning, Walnut Creek, CA (US); Jacqueline Gonzalez, Stockton, CA (US)

(73) Assignee: Sequoia Benefits and Insurance Services, LLC, San Mateo, CA (US)

( * ) Notice: Subject to any disclaimer, the term of this patent is extended or adjusted under 35 U.S.C. 154(b) by 0 days.

(21) Appl. No.: 18/757,382

(22) Filed: Jun. 27, 2024

(65) Prior Publication Data

US 2026/0004250 A1 Jan. 1, 2026

(51) Int. Cl.
*G06Q 10/1057* (2023.01)
*G06Q 30/0204* (2023.01)

(52) U.S. Cl.
CPC ..... *G06Q 10/1057* (2013.01); *G06Q 30/0205* (2013.01)

(58) Field of Classification Search
None
See application file for complete search history.

(56) References Cited

U.S. PATENT DOCUMENTS

| | | | |
|---|---|---|---|
| 8,725,603 | B1 | 5/2014 | Harman |
| 10,600,105 | B1 | 3/2020 | Kumar |

(Continued)

FOREIGN PATENT DOCUMENTS

| | | | |
|---|---|---|---|
| CA | 2707496 | A1 | 6/2009 |
| CN | 118333634 | A | 7/2024 |

(Continued)

OTHER PUBLICATIONS

F. Firouzi et al., "Fusion of IoT, AI, Edge-Fog-Cloud, and Blockchain: Challenges, Solutions, and a Case Study in Healthcare and Medicine," in IEEE Internet of Things Journal, vol. 10, No. 5, pp. 3686-3705, 1 Mar. 1, 2023. (Year: 2023).*

(Continued)

*Primary Examiner* — Stephanie Z Delich
(74) *Attorney, Agent, or Firm* — Lowenstein Sandler LLP

(57) ABSTRACT

A subset of producers that are a potential match to provide services to a first consumer are identified among producers via software-as-a-service (SaaS) management platform. A first output indicating a likelihood the first consumer will consume the services provided by the subset of producers is obtained from a first trained artificial intelligence (AI) model. A score for each of the subset of producers is generated based on one or more outputs including the first output. The score indicates a likelihood that a respective producer of the subset of producers is a match for the first consumer. A notification indicating the scores for the subset of producers is provided.

22 Claims, 15 Drawing Sheets

(56) References Cited

U.S. PATENT DOCUMENTS

| | | | | |
|---|---|---|---|---|
| 2013/0198025 | A1* | 8/2013 | Picken | G06Q 30/02 705/26.61 |
| 2014/0006058 | A1 | 1/2014 | Schoenberg | |
| 2014/0149249 | A1 | 5/2014 | Goad | |
| 2015/0012467 | A1* | 1/2015 | Greystoke | G06Q 30/0619 706/12 |
| 2016/0253710 | A1* | 9/2016 | Publicover | H04W 4/21 705/14.66 |
| 2017/0076372 | A1* | 3/2017 | Kozloski | G06F 21/10 |
| 2019/0172116 | A1 | 6/2019 | Amjadi | |
| 2019/0236645 | A1* | 8/2019 | Kamma | G06N 3/08 |
| 2021/0125253 | A1* | 4/2021 | Vega | H04L 67/12 |
| 2021/0329124 | A1 | 10/2021 | Li | |
| 2022/0261661 | A1 | 8/2022 | Khaligh | |
| 2023/0135553 | A1 | 5/2023 | Cella | |
| 2023/0206062 | A1 | 6/2023 | Scherwitz | |
| 2023/0259654 | A1 | 8/2023 | Jalal | |
| 2023/0334457 | A1 | 10/2023 | Gainor | |

FOREIGN PATENT DOCUMENTS

| | | | |
|---|---|---|---|
| EP | 3709236 | A1 | 9/2020 |
| WO | 2022271686 | A2 | 12/2022 |
| WO | 2024006188 | A1 | 1/2024 |
| WO | 2025174737 | A1 | 8/2025 |

OTHER PUBLICATIONS

Firouzi et al., "Fusion of IoT, AI, Edge-Fog-Cloud, and Blockchain: Challenges, Solutions, and a Case Study in Healthcare and Medicine," in IEEE Internet of Things Journal, vol. 10, No. 5, pp. 3686-3705, Mar. 1, 2023.

* cited by examiner

USING ARTIFICIAL INTELLIGENCE MODELS TO IDENTIFY A PRODUCER AND CONSUMER MATCH

TECHNICAL FIELD

Aspects and embodiments of the disclosure relate to data processing, and more specifically, to using one or more artificial intelligence (AI) models to identify a producer and consumer match.

BACKGROUND

Artificial intelligence (AI) models can help address complex problems across various fields. By leveraging sophisticated algorithms and extensive training data, an AI model can decipher intricate data patters, extract crucial insights, and make informed predictions.

SUMMARY

The following is a simplified summary of the disclosure to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An embodiment of the disclosure provides a computer-implemented method comprising identifying, among a plurality of producers, a subset of producers that are a potential match to provide services, via a software-as-a-service (SaaS) management platform, to a first consumer; obtaining, from a first trained artificial intelligence (AI) model, a first output indicating a likelihood the first consumer will consume the services provided by the subset of producers; generating, by a processing device, a score for each of the subset of producers based on one or more outputs comprising the first output, the score indicating a likelihood that a respective producer of the subset of producers is a match for the first consumer; and providing a notification indicating the scores for the subset of producers.

In some embodiments, identifying, among the plurality of producers, the subset of producers is based on one or more criteria related to characteristics of the first consumer and characteristics of the plurality of producers that provide, via the SaaS management platform, one or more services.

In some embodiments, the method further comprises: providing a first input to the first trained AI model, the first input comprising first consumer preference data related to the first consumer.

In some embodiments, the method further comprises: obtaining, from a second trained AI model, a second output indicating an estimate that a response from a first producer of the subset of producers to a request for the services for the first consumer will satisfy consumer preferences of the first consumer, wherein the one or more outputs comprises the second output.

In some embodiments, the method further comprises: providing a second input to the second trained AI model, the second input comprising: first consumer data pertaining to the first consumer, second consumer data pertaining to a second consumer, producer data pertaining to the first producer, and external factor data identifying one or more factors external to and that affect the first producer, the first consumer, and the second consumer.

In some embodiments, the method further comprises: obtaining, from a third trained AI model, a third output indicating an estimate of occurrences of future life events of employees that affect the services consumed by the first consumer, wherein the one or more outputs comprises the third output.

In some embodiments, the method further comprises: providing a third input to the third trained AI model, the third input comprising demographic data related to the first consumer, historical life event data pertaining to employees of the first consumer, and statistical life event data identifying statistical metrics of life events for a population.

A further embodiment(s) of the disclosure provides a system comprising: a memory; and a processing device, coupled to the memory, the processing device to perform a method according to any aspect or embodiment described herein. A further embodiment(s) of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
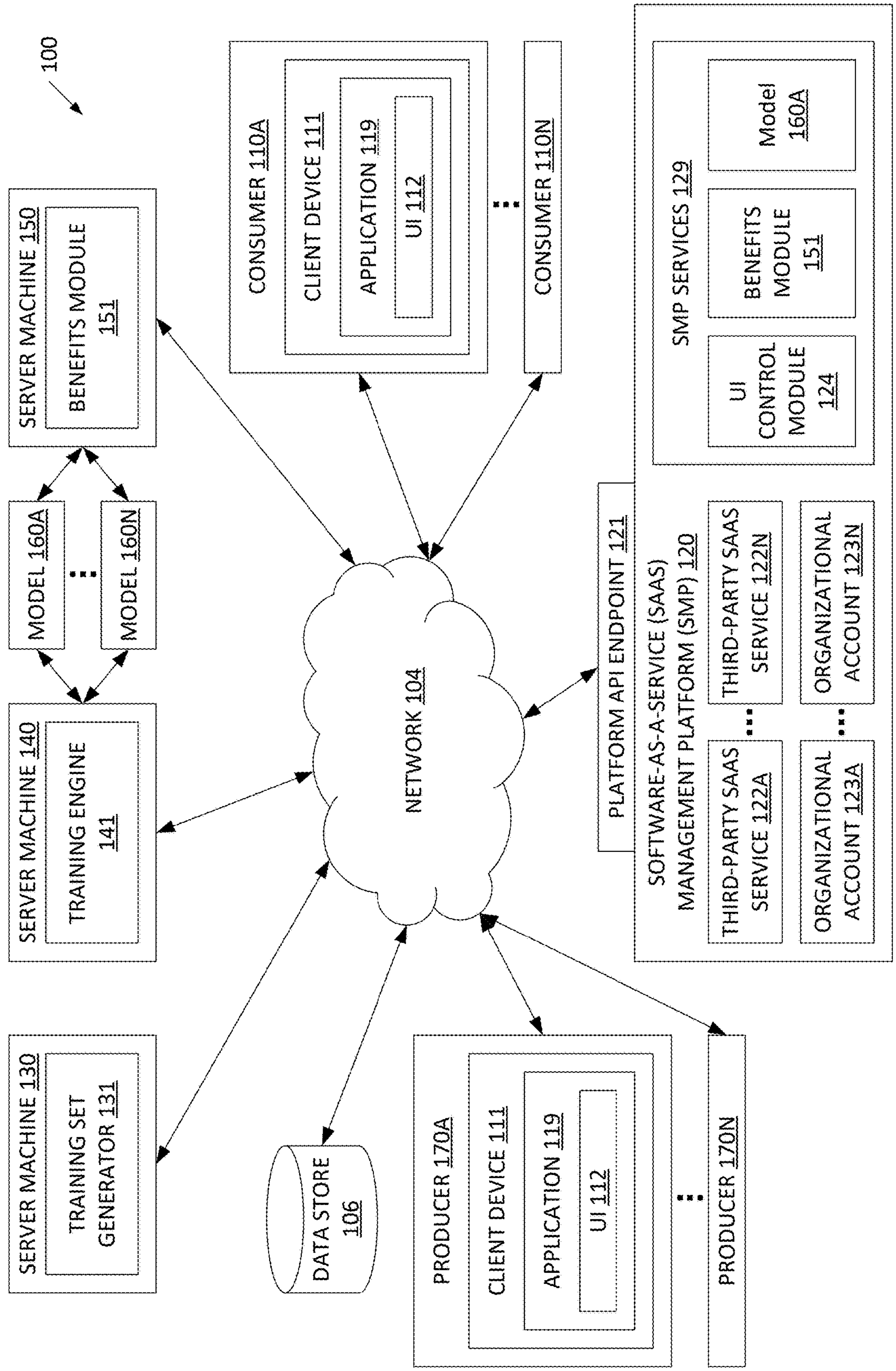
FIG. 1 illustrates an example system, in accordance with some embodiments of the disclosure.

Embodiments described herein are related to methods and systems for using an artificial intelligence (AI) model to identify a producer and consumer match.

A consumer can include an entity that consumes products and/or services. Producers can provide products and/or services for consumption. An agent can function as an intermediary to facilitate the transfer and use of products and/or services between a producer(s) and consumer(s).

For example, a producer can include a carrier (e.g., insurance carrier) that provides benefit packages or plans to an organization (e.g., a consumer) and the personnel thereof. A consumer can include an organization having personnel that use the products and/or services offered by the carrier. A platform, such as a software-as-a-service (SaaS) management platform can function as an agent that offers first-party services (e.g., services developed by the SaaS management platform) and third-party services to the consumers. For instance, the SaaS management platform can facilitate requests to carriers on behalf of consumers for benefit packages and implement an interface (e.g., human resource software) that allows consumers and the personnel thereof to manage subscribed benefit packages.

An agent can submit requests on behalf of a consumer to numerous producers for products and/or services (and the terms thereof). Various factors can limit the number of producers to which a request can be submitted by the agent on behalf of the consumer, such that requests cannot be submitted to all producers. For example, the various factors can include one or more of a limited resources of the agent to obtain, process, or generate producer and/or consumer data, the amount of time to generate a request, the amount of time to receive a response from a producer to a sent request, the quantity and/or type of data to be included in the request, or the like. Once the producers respond to the requests, the agent can determine a from the responding producers a subset of the producers that are a match for the consumer. The agent can provide the subset of the producers (and identify the particular products and/or services) to the consumer as a selection of matched producers. Once a producer is selected by the consumer, the agent can implement first-party SaaS services that allow the consumer to manage the services provided by the producer. For example, the agent can determine one or more producers from multiple producers from which to request proposals for products and/or services that are to be provided to a consumer. The producers can respond with benefit information including information about various benefits packages or plans and the terms thereof (e.g., products and/or services for the consumer). The agent can assess the responses, identify a subset of producers (e.g., subset of the one or more producers), and provide the subset of producers and the corresponding benefit information to the consumer for selection. The aforementioned process can be complicated by the numerous data points that are used to select the initial one or more producers from which the agent is to request proposals. The process can be inconsistent and sub-optimal where, for example, consumers with the same or similar profile are matched with different and at times unsuitable producers, at least in part because the agent inconsistently or erroneously determines the initial one or more producers from which to request proposals. The aforementioned process can be further complicated since the criteria that producers use to generate proposals for consumers can be unknown by the consumer and agent and specific to a particular producer, which obfuscates value information that would be beneficial to the agent in consistently and accurately determining from which producers to request proposals.

For example, consumers can request information about benefits packages (e.g., products and/or services of the producer), including costs to the consumer and features of the benefits packages. Often many features of the benefits package and costs to the consumer for the benefits package can be specific to the consumer. For instance, the insurance carrier can use information regarding consumer-desired features of the benefits package in combination with information about the consumer to determine the cost to the consumer (e.g., to be paid to the producer) to provide the benefits package to the consumer. Additionally, due to financial, regulatory, or other considerations, some insurance carriers may prefer to provide benefits packages to consumers that meet certain criteria, including for example one or more of a geographic location, a certain headcount size of a consumer, a certain revenue size of a consumer, consumers with employees that have certain demographics, or the like. In another instance, an insurance carrier may prefer to provide benefits packages to consumers with employees of certain demographics (e.g., younger employees). If the demographics of a particular consumer do not match the preferred demographics, the insurance carrier may substantially increase the costs to the consumer. Often the criteria a particular carrier implements can be unknown outside the carrier. With such complexity and unknown variables, determining which producer(s), such as insurance carriers have a high likelihood of providing benefits packages that are suitable for the consumer and hence, to which producers requests should be sent can be challenging.

Aspects of the present disclosure address the above-mentioned and other challenges by using one or more of consumer data, producer data, external factor data, and outputs from one or more AI models as inputs to a ranking model to identify one or more producers that are a match for a consumer. Producer(s) that are a match for the consumer can include producers that have a high likelihood (e.g., estimated high likelihood) of providing products and/or services (e.g., benefits packages) that are suitable for the consumer (e.g., suitable based on the user preferences and/or characteristics). In some embodiments, a match between a consumer and producer can indicate that a request, to a producer, for services for a particular consumer is likely to produce a response identifying services (and terms thereof) that are suitable for the consumer. In some embodiments, the AI model can identify producers to which requests for services can be sent by the SaaS management platform on behalf of the consumer. In some embodiments, one or more of consumer data, producer data and external factor data (or sub-categories of such data) can be provided as input to the one or more AI models, which can provide, as an output, an indication of relevant features (e.g., and values thereof) that can be used as weights by the ranking model to rank a subset of producers that are a match for the consumer.

A ranking model can receive model inputs that include consumer preference data and a set of producers. Additional consumer data and/or producer data can also be provided to the ranking model as a model input. The model input can be filtered by various input filters to remove certain producers that will not be a match for the producer. For example, a consumer located in California will not seek services from a producer that can only provide services to organizations with employees located in Washington. The ranking model can rank the subset of producers into a ranked list, with producers that are most likely to match the consumer ranked higher than producers that are less likely to match the consumer. The ranking model can generate this ranked list based on one or more ranking weights (e.g., referred to herein as "weights"). These weights can be determined by one or more AI models that can, for example, infer criteria used by producers to generate responses (e.g., proposals) but are unknown by the agent (and/or consumers). In some embodiments, a first AI model can generate an output (e.g., consumer usage weight) that estimates usage by a consumer of services provided by a producer (e.g., estimates the amount of services the consumer will consume and/or the type of services the consumer will consume). In some embodiments, a second AI model can generate an output (e.g., producer tolerance weight) that estimates whether a response from a producer will satisfy consumer preferences of a consumer. In some embodiments, a third AI model can generate an output that estimates occurrences of future life events for employees of the consumer that can affect the consumption (e.g., future consumption) of services by the consumer.

As noted, a technical problem addressed by some embodiments of the disclosure is identifying, estimating and/or generating a producer match data for a consumer without having full information pertaining to the producer (e.g., producer criteria in providing services to consumers).

A technical solution to the above identified technical problem can include using a ranking model (e.g., that can implement a set of rules) and/or other algorithms described herein to identify producer match data for a consumer using one or more of consumer data, producer data, or external factor data. The producer match data can include a ranked list of a subset of producers that match the consumer, where higher ranked producers in the subset of producers are a closer match for the consumer. Another technical solution is training one or more AI models with inputs including one or more of consumer data, producer data, or external factor data that are paired with outputs. Another technical solution is using the outputs from the AI models as inputs to the ranking model to rank the subset of producers. The technical solution allows a computer system to generate accurate estimates of matches between producers (and respective services) and consumers. Such accurate estimates were not possible in previous computer systems at least in part because the lack of access to full information pertain to producers. Further the technical solution can provide automation using for example, a set of rules (e.g., ranking model and/or weights based on an output of one or more AI models) to determining matches between producers and consumers with consistency and/or accuracy that was not previously available (e.g., to solve the problem of matching producers with consumers).

The products and/or services available from an insurance carrier can be referred to herein as "benefits packages." Benefits packages can include products and/or services for employees associated with the consumer, including for example one or more of (i) health insurance coverage, (ii) vision insurance coverage, (iii) dental insurance coverage, (iv) disability and/or life insurance coverage, (v) retirement account options, (vi) employee assistance programs (EAPs), (vii) transportation arrangements, (viii) employee discounts, or the like. Benefits packages can also include products and/or services for the consumer, including for example one or more of (i) property insurance coverage, (ii) workplace insurance coverage, (iii) cyber event insurance coverage, (iv) other risk-based insurance coverage, or the like.

An "organization" can refer to an entity, such as a legal entity that includes multiple people (e.g., organization personnel) that has a particular purpose. Examples of organizations can include government agencies, non-profits, corporations (e.g., authorized by law to act as a single entity or legal entity), and partnerships.

A "consumer" or "client organization" (also referred to as "client" herein) can refer to an entity that accesses services from a platform, such as the SaaS management platform provided by a first-party organization (e.g., an agent). In some embodiments, the entity can include an organization having personnel (also referred to as "employees" herein) that access products and/or services via the SaaS management platform. For example, the employees of a consumer organization can access services of the SaaS management platform using respective consumer accounts. In some embodiments, the consumer can subscribe to first-party services offered by the SaaS management platform. In some embodiments, the consumer accesses first-party products and/or services provided by the SaaS management platform. In some embodiments, the consumer can subscribe to third-party products and/or services provided by a third-party, such as a producer. In some embodiments, the consumer accesses or consumes products and/or services of a producer (e.g., third-party product and/or services) via the SaaS management platform where the products and/or services are facilitated by the SaaS management platform. For example, the consumer can include one or more employees (typically many employees) that carry out the goals and functions of the consumer organization and receive benefits, such as healthcare or retirement plans. The SaaS management platform identify one or more producers that offer benefit packages that are suitable for the consumer. The consumer can subscribe to a particular benefit package from a particular producer, and the SaaS management platform can provide an interface that allows the consumer and the employees thereof to manage one or more features of the particular benefit package.

"Consumer data" generally describes information associated with, derived from, or describing a consumer. For example, consumer data can include one or more of information that describes the consumer or the employees thereof (e.g., organization data, or demographic data), information derived from consumer activities (e.g., benefits usage data), or information provided by the consumer to the SaaS management platform (e.g., preference data). Additional details regarding consumer data are described below with reference to FIGS. 2A-C.

A "producer" can provide products and/or services (e.g., benefit packages) to an individual or another organization, such as the consumer. In some embodiments, the producer is an organization, such as a carrier (e.g., insurance carrier). In some embodiments, the products and/or services provided by the producer can be facilitated and/or managed by the SaaS management platform. For example, the producer (e.g., insurance carrier) can provide employee benefit packages, such as one or more of employee insurance, retirement plans, property insurance, risk insurance, or the like to a consumer. The SaaS management platform can facilitate a request from the consumer to the producer for products and/or services. In some embodiments, the SaaS management platform can facilitate a response from the producer to the consumer corresponding to the consumer request. The SaaS management platform can further provide an interface (e.g., graphical user interface (GUI)) that allows the consumer and the employees thereof to visualize and manage features of employee benefit packages.

"Producer data" can refer to information associated with, derived from, or describing a producer. For example, producer data can include information about the products and/or services provided by the producer. In some embodiments, the producer data can include one or more of information that describes types of products and/or services provided by the producer (e.g., benefits data), information that describes cost trends (e.g., trend data), information about the producer derived by the first-party organization (e.g., relationship data), or the like. Additional details regarding producer data are described below with reference to FIG. 2.

A "sector" can refer the industry or segment (e.g., segment of the economy) that an organization targets with products and/or services. The sector can include organizations that provide similar products and/or services. For example, a producer (e.g., insurance carrier) can provide similar products and/or services as other producers of a producer sector (e.g., industry). In another example, a consumer can provide similar products and/or services as other consumers in a consumer sector.

"External factor data" can includes that information reflects one or more factors or variables, such as events, influences or conditions that can impact one or more of a consumer or producer. In some embodiments, the events, influences, or conditions can be external events, external influences, or external conditions. The events, influences or conditions may affect one or more of the consumer or the producer, but are not controlled by either the consumer or the producer. External factor data can include one or more of consumer sector data, producer sector data, economic data, world and/or natural event data, or the like. Additional details regarding producer data are described below with reference to FIG. 2A-C.

FIG. 1 illustrates an example of a system 100, in accordance with aspects of the disclosure. The system 100 includes a SaaS management platform 120, one or more server machines 130-150, a data store 106, and the consumer 110A through the consumer 110N connected to network 104. In some embodiments, the system 100 can include one or more other platforms (e.g., "third-party platforms").

In some embodiments, network 104 can include a public network (e.g., the Internet), a private network (e.g., a local area network (LAN) or wide area network (WAN)), a wired network (e.g., Ethernet network), a wireless network (e.g., an 702.11 network or a wireless fidelity (Wi-Fi) network), a cellular network (e.g., a Long Term Evolution (LTE) network), routers, hubs, switches, server computers, and/or a combination thereof.

Data store 106 can be a persistent storage that is capable of storing data such as consumer data, producer data, external factor data, AI model data, etc. Data store 106 can be hosted by one or more storage devices, such as main memory, magnetic or optical storage based disks, tapes or hard drives, network-attached storage (NAS), storage area network (SAN), and so forth. In some embodiments, data store 106 can be a network-attached file server, while in other embodiments the data store 106 can be another type of persistent storage such as an object-oriented database, a relational database, and so forth, that can be hosted by SaaS management platform 120, or one or more different machines coupled to the server hosting the SaaS management platform 120 via the network 104. In some embodiments, data store 106 can be capable of storing one or more data items, as well as data structures to tag, organize, and index the data items. A data item can include various types of data including structured data, unstructured data, vectorized data, etc., or types of digital files, including text data, audio data, image data, video data, multimedia, interactive media, data objects, and/or any suitable type of digital resource, among other types of data. An example of a data item can include a file, database record, database entry, programming code or document, among others. In some embodiments, data store 106 can include historical information (e.g., historical data items) related to one or more of consumer data, producer data, external factor data, or the like.

One or more of a consumer 110A (e.g., also referred to herein as a "client organization") or a consumer 110N (also referred to herein as "consumers 110A-110N") can refer to an organization that uses the services provided by the SaaS management platform 120. The consumers 110A-110N can each include one or more client devices 111. The client device(s) (e.g., client device 111) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client devices 111 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some embodiments, client device(s) may also be referred to as a "client device" herein. Although a single client device 111 is shown for purposes of illustration rather than limitation, one or more client devices can be implemented in some embodiments. Client device 111 will be referred to as client device 111 or client devices 111 interchangeably herein.

In some embodiments, the SaaS management platform 120 can group the consumers 110A-110N into one or more "client clusters" (also referred to herein as "consumer clusters") based on a similarity between one or more characteristics of the consumers 110A-110N. A cluster, such as a consumer cluster, can refer to a group (e.g., group of consumers) that share common characteristics. In some embodiments, the shared characteristics may not be determined without an AI model (e.g. not determined by the human mind). In some embodiments, the model 160A, or another model (e.g., model 160N) can be trained to cluster the consumers 110A-110N into one or more consumer clusters. In some embodiments, clustering algorithms can be used to cluster the consumers 110A-110N, including for example one or more of K-means clustering, hierarchical clustering, density-based spatial clustering of applications with noise (DBSCAN), or Gaussian mixture clustering. In some embodiments, clustering the consumers 110A-110N into one or more clusters can generate consumer cluster data for each organization. Additional details regarding consumer cluster data are described below with reference to FIG. 2A-C.

In some embodiments, characteristics of the consumers 110A-110N used for clustering can include one or more of organization data, demographic data, benefits usage data, or preference data. Additional details regarding these characteristics are described below with reference to FIG. 2A-C.

In some embodiments, a client device, such as client device 111, can implement or include one or more applications, such as application 119 executed at client device 111. In some embodiments, application 119 can be used to communicate (e.g., send and receive information) with SaaS management platform 120. In some embodiments, application 119 can implement user interfaces (UIs) (e.g., graphical user interfaces (GUIs)), such as a user interface (UI) (e.g., UI 112) that may be webpages rendered by a web browser and displayed on the client device 111 in a web browser window. In another embodiment, the UIs 112 of client application, such as application 119 may be included in a stand-alone application downloaded to the client device 111 and natively running on the client device 111 (also referred to as a "native application" or "native client application" herein). In some embodiments, the benefits module 151 can be implemented as part of application 119. In other embodiments, the benefits module 151 can be separate from application 119 and application 119 can interface with benefits module 151.

In some embodiments, one or more client devices 111 can be connected to the system 100. In some embodiments, client devices, under direction of the SaaS management platform 120 when connected, can present (e.g., display) a UI 112 to a user of a respective client device through application 119. The client devices 111 may also collect input from users through input features.

In some embodiments, a UI 112 may include various visual elements (e.g., UI elements) and regions, and can be a mechanism by which the user engages with the SaaS management platform 120, and the system 100 at large. In some embodiments, the UI 112 of a client device 111 can include multiple visual elements and regions that enable presentation of information, for decision-making, content delivery, etc. at a client device 111. In some embodiments, the UI 112 may sometimes be referred to as a graphical user interface (GUI)).

In some embodiments, the UI 112 and/or client device 111 can include input features to intake information from a client device 111. In one or more examples, a user of client device 111 can provide input data (e.g., a user query, control commands, etc.) into an input feature of the UI 112 or client device 111, for transmission to the SaaS management platform 120, and the system 100 at large. Input features of UI 112 and/or client device 111 can include space, regions, or elements of the UI 112 that accept user inputs. For example, input features may include visual elements (e.g., GUI elements) such as buttons, text-entry spaces, selection lists, drop-down lists, etc. For example, in some embodiments, input features may include a chat box which a user of client device 111 can use to input textual data (e.g., a user query). The application 119 via client device 111 can then transmit that textual data to SaaS management platform 120, and the system 100 at large, for further processing. In other examples, input features can include a selection list, in which a user of client device 111 can input selection data e.g., by selecting, or clicking. The application 119 via client device 111 can then transmit that selection data to SaaS management platform 120, and the system 100 at large, for further processing.

One or more of a producer 170A (e.g., also referred to herein as a "carrier" or "carrier organization") or an nth producer 170N (also referred to herein as "producers 170A-170N") can refer to an organization that provides one or more products and/or services (e.g., benefits packages) to consumers 110A-110N through the SaaS management platform 120. As illustrated, the producers 170A-170N can include one or more client devices 111, which can include one or more of the application 119 or the UI 112 as described above with reference to consumers 110A-110N. In some embodiments, the one or more producers 170A-170N can provide one or more third-party SaaS services 122A-122N to one or more consumers 110A-110N through the SaaS management platform 120.

In some embodiments, a client device 111 can access the SaaS management platform 120 through network 104 using one or more application programming interface (API) calls via platform API endpoint 121. In some embodiments, SaaS management platform 120 can include multiple platform API endpoints 121 that can expose services, functionality, or information of the SaaS management platform 120 to one or more client devices 111. In some embodiments, a platform API endpoint 121 can be one end of a communication channel, where the other end can be another system, such as a client device 111 associated with a user account. In some embodiments, the platform API endpoint 121 can include or be accessed using a resource locator, such a universal resource identifier (URI), universal resource locator (URL), of a server or service. The platform API endpoint 121 can receive requests from other systems, and in some cases, return a response with information responsive to the request. In some embodiments, HTTP (Hypertext Transfer Protocol), HTTPS (Hypertext Transfer Protocol Secure) methods (e.g., API calls) can be used to communicate to and from the platform API endpoint 121.

In some embodiments, the platform API endpoint 121 can function as a computer interface through which access requests are received and/or created. In some embodiments, the platform API endpoint 121 can include a platform API whereby external entities or systems can request access to services and/or information provided by the SaaS management platform 120. The platform API can be used to programmatically obtain services and/or information associated with a request for services and/or information.

In some embodiments, the API of the platform API endpoint 121 can be any suitable type of API such as a REST (Representational State Transfer) API, a GraphQL API, a SOAP (Simple Object Access Protocol) API, and/or any suitable type of API. In some embodiments, the SaaS management platform 120 can expose through the API, a set of API resources which when addressed can be used for requesting different actions, inspecting state or data, and/or otherwise interacting with the SaaS management platform 120. In some embodiments, a REST API and/or another type of API can work according to an application layer request and response model. An application layer request and response model can use HTTP, HTTPS, SPDY, or any suitable application layer protocol. Herein HTTP-based protocol is described for purposes of illustration, rather than limitation. The disclosure should not be interpreted as being limited to the HTTP protocol. HTTP requests (or any suitable request communication) to the SaaS management platform 120 can observe the principals of a RESTful design or the protocol of the type of API. RESTful is understood in this document to describe a Representational State Transfer architecture. The RESTful HTTP requests can be stateless, thus each message communicated contains all necessary information for processing the request and generating a response. The platform API can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

It can be appreciated that in some embodiments, any element, such as server machine 130, server machine 140, server machine 150, and/or data store 106 may include a corresponding API endpoint for communicating with APIs.

In some embodiments, the SaaS management platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to data or services. Such computing devices can be positioned in a single location or can be distributed among many different geographical locations. For example, SaaS management platform 120 can include a plurality of computing devices that together may comprise a hosted computing resource, a grid computing resource, or any other distributed computing arrangement. In some embodiments, SaaS management platform 120 can correspond to an elastic computing resource where the allotted capacity of processing, network, storage, or other computing-related resources may vary over time.

In some embodiments, the SaaS management platform 120 can include one or more third-party SaaS services 122A through third party SaaS services 122N (also referred to herein as "third-party SaaS services 122A-122N"). In some embodiments, the SaaS management platform 120 can include one or more first-party services, illustratively shown as SaaS management platform (SMP) services 129 (also referred to herein as SMP services 129). When a client device 111 accesses the SaaS management platform 120, the SaaS management platform 120 can provide the client device 111 with access to one or more services (e.g., one or more third-party SaaS services 122A-122N). In some embodiments, the client device 111 can access a data item using one or more of the SaaS management platform services 129 or one or more of the third-party SaaS services 122A-122N. The client device 111 receives a data item from the SaaS management platform 120 in response to a request for the data item. In some embodiments, the SaaS management platform 120 can function as a "black box" with respect to the client device 111. That is, regardless of the original source of the data item (e.g., whether from the SaaS management platform services 129, or from one or more third-party SaaS services 122A-122N) the client device 111 can receive the data item as if the data item originated from the SaaS management platform 120.

In some embodiments, SaaS management platform 120 can provide an organizational accounts 123A through an organizational account 123N that are assigned to a particular organization, such as a consumer 110A or a consumer 110N, respectively. For example, Corporation A can be assigned organizational account 123A and corporation N can be assigned organizational account 123N. In some embodiments, SaaS management platform 120 can provide an organizational account 123A with one or more user accounts. For example, organizational account 123A can be a root account and user accounts (e.g., for employees of an organization) can be under the root account in a hierarchical structure. In some embodiments, a consumer 110A (or SaaS management platform 120) can assign user accounts to respective users within the organization. User accounts can be used to access the SaaS management platform 120 via client devices 111A-111N. A "user" can be an individual of the organization associated with a respective user account. In some embodiments, aspects of the disclosure encompass a "user" being an entity controlled by a group of organization personnel and/or an automated source. For example, a group of organization personnel federated as one or more departments in an organization can be considered a "user." Each user account can be assigned authorization credentials to access the SaaS management platform 120 (e.g., a username and password) and further use authentication credentials (e.g., an access token, etc.) to access specific services provided thereby. In some embodiments, user accounts can include enhanced privileges (e.g., administrator accounts, information technology (IT) specialist accounts, etc.).

In some embodiments, the SaaS management platform services 129 can provide one or more services to the consumer 110A (including employees of the consumer 110A). In some embodiments, SaaS management platform services 129 can also include a benefits module 151. The benefits module 151 can receive information from the SaaS management platform 120 (e.g., consumer data, producer data, external factor data, etc.) and provide the received information as input to the model 160A and/or the model 160N. The benefits module 151 can obtain output generated by the model 160A and/or the model 160N based on the information provided as an input.

In some embodiments, SaaS management platform 120 can implement the benefits module 151. In some embodiments, the benefits module 151 can implement one or more features and/or operations as described herein. In some embodiments, the benefits module 151 can include or access the model 160A and/or the model 160N. In some embodiments, the SaaS management platform 120 can receive one or more of consumer data, producer data, or external factor data. The SaaS management platform 120 can provide the consumer data, the producer data, and/or the external factor data to the benefits module 151. In some embodiments, the benefits module 151 can use one or more of the consumer data, the producer data, and/or the external factor data as input to a trained AI model, such as model 160A and/or the model 160N. Model 160A and/or the model 160N can generate one or more outputs. As described above, in some embodiments, the benefits module 151 can obtain cluster data and use the cluster data along with one or more of the consumer data, the producer data and/or the external factor data as input to the trained AI model. In some embodiments, the benefits module 151 can perform input preprocessing on data received as input for the model 160A and/or the model 160N. Additional details regarding training the AI model are described below with reference to FIG. 2 and FIG. 3.

The benefits module 151 can obtain one or more outputs from the AI model (e.g., model 160A and/or the model 160N). In some embodiments, the benefits module 151 can provide the one or more outputs to one or more of the SaaS management platform 120, a client device 111 of a consumer 110A, or a client device 111 of a producer 170A. In some embodiments, the benefits module 151 can perform output postprocessing on data received as output from the model 160A and/or the model 160N. Additional details regarding using the AI model (e.g., model 160A and/or the model 160N) are described below with reference to FIGS. 4A-C FIGS. 5A-C, and FIGS. 6A-C.

In some embodiments, SaaS management platform 120 and in particular, the UI control module 124 may perform user-display functionalities of the system such as generating, modifying, and monitoring the client-side UIs (e.g., graphical user interfaces (GUI)) and associated components that are presented to users of the SaaS management platform 120 through UI 112 client devices 111. For example, the benefits module 151 via UI control module 124 can generate the UIs (e.g., UI 112 of client device 111) that users interact with while engaging with the SaaS management platform 120.

In some embodiments, an artificial intelligence (AI) model (e.g., also referred to as an "machine learning model" herein) can include a discriminative AI model (also referred to as "discriminative machine learning model" herein), a generative AI model (also referred to as "generative machine learning model" herein), and/or other AI model.

In some embodiments, a discriminative AI model can model a conditional probability of an output for given input(s). A discriminative AI model can learn the boundaries between different classes of data to make predictions on new data. In some embodiments, a discriminative AI model can include a classification model that is designed for classification tasks, such as learning decision boundaries between different classes of data and classifying input data into a particular classification. Examples of discriminative AI models include, but are not limited to, support vector machines (SVM) and neural networks.

In some embodiments, a generative AI model learns how the input training data is generated and can generate new data (e.g., original data). A generative AI model can model the probability distribution (e.g., joint probability distribution) of a dataset and generate new samples that often resemble the training data. Generative AI models can be used for tasks involving image generation, text generation and/or data synthesis. Generative AI models include, but are not limited to, gaussian mixture models (GMMs), variational autoencoders (VAEs), generative adversarial networks (GANs), large language models (LLMs), vision-language models (VLMs), multi-modal models (e.g., text, images, video, audio, depth, physiological signals, etc.), and so forth.

Training of and inference using discriminative AI models (e.g., machine learning models) is described herein. Server machine 130 includes a training set generator 131 that is capable of generating training data (e.g., a set of training inputs and a set of target outputs) to train a model 160A and/or a model 160N (e.g., a discriminative AI model). In some embodiments, training set generator 131 can generate the training data based on various data (e.g., stored at data store 106 or another data store connected to the system 100 via the network 104). The data store 106 can store metadata associated with the training data. Additional details regarding training of the model 160A and/or the model 160N are describe with reference to FIGS. 4A-C, FIGS. 5A-C, and FIGS. 6A-C.

Server machine 140 includes a training engine 141 that is capable of training a model 160A and/or the model 160N using the training data from training set generator 131. The model 160A and/or the model 160N (also referred to "machine learning model" or "artificial intelligence (AI) model" herein) may refer to the model artifact that is created by the training engine 141 using the training data that includes training inputs (e.g., features) and corresponding target outputs (correct answers for respective training inputs) (e.g., labels). The training engine 141 may find patterns in the training data that map the training input to the target output (the answer to be predicted) and provide the model 160A and/or the model 160N that captures these patterns. The model 160A and/or the model 160N may be composed of, e.g., a single level of linear or non-linear operations (e.g., a support vector machine (SVM), or may be a deep network, i.e., an AI model that is composed of multiple levels of non-linear operations). An example of a deep network is a neural network with one or more hidden layers, and such AI model may be trained by, for example, adjusting weights of a neural network in accordance with a backpropagation learning algorithm or the like. Model 160A and/or the model 160N can use one or more of a support vector machine (SVM), Radial Basis Function (RBF), clustering, supervised AI, semi-supervised AI, unsupervised AI, k-nearest neighbor algorithm (k-NN), linear regression, random forest, neural network (e.g., artificial neural network), a boosted decision forest, etc. For convenience rather than limitation, the remainder of this disclosure describing discriminative AI model will refer to the implementation as a neural network, even though some implementations might employ other type of learning machine instead of, or in addition to, a neural network.

In some embodiments, such as with a supervised AI model, the one or more training inputs of the set of the training inputs can be paired with respective one or more training outputs of the set of training outputs. The training input-output pair(s) can be used as input to the AI model to help train the AI model to determine, for example, patterns in the data. The model parameters (e.g., values thereof) can be adjusted based on the training.

In some embodiments, training data, such as training input and/or training output, and/or input data to a trained AI model (collectively referred to as "AI model data" herein) can be preprocessed before providing the aforementioned data to the (trained or untrained) AI model (e.g., discriminative AI model and/or generative AI model) for execution. Preprocessing as applied to AI models (e.g., discriminative AI model and/or generative AI model) can refer to the preparation and/or transformation of AI model data.

In some embodiments, preprocessing can include data scaling. Data scaling can include a process of transforming numerical features in raw AI model data such that the preprocessed AI model data has a similar scale or range. For example, Min-Max scaling (Normalization) and/or Z-score normalization (Standardization) can be used to scale the raw AI model. For instance, if the raw AI model data includes feature representing temperatures in Fahrenheit, the raw AI model data can be scaled to a range of [0, 1] using Min-Max scaling.

In some embodiments, preprocessing can include data encoding. Encoding data can include a process of converting categorical or text data into a numerical format on which a AI model can efficiently execute. Categorical data (e.g., qualitative data) can refer to a type of data that represents categories and can be used to group items or observations into distinct, non-numeric classes or levels. Categorical data can describe qualities or characteristics that can be divided into distinct categories, but often does not have a natural numerical meaning. For example, colors such as red, green, and blue can be considered categorical data (e.g., nominal categorical data with no inherent ranking). In another example, "small," "medium," and "large" can be considered categorical data (ordinal categorical data with an inherent ranking or order). An example of encoding can include encoding a size feature with categories ["small," "medium," "large"] by assigning 0 to "small," 1 to "medium," and 2 to "large."

In some embodiments, preprocessing can include data embedding. Data embedding can include an operation of representing original data in a different space, often of reduced dimensionality (e.g., dimensionality reduction), while preserving relevant information and patterns of the original data (e.g., lower-dimensional representation of higher-dimensional data). The data embedding operation can transform the original data so that the embedding data retains relevant characteristics of the original data and is more amenable for analysis and processing by AI models. In some embodiments embedding data can represent original data (e.g., word, phrase, document, or entity) as a vector in vector space, such as continuous vector space. Each element (e.g., dimension) of the vector can correspond to a feature or property of the original data (e.g., object). In some embodiments, the size of the embedding vector (e.g., embedding dimension) can be adjusted during model training. In some embodiments, the embedding dimension can be fixed to help facilitate analysis and processing of data by AI models.

In some embodiments, the training set is obtained from server machine 130. Server machine 150 includes a benefits module 151 that provides current data (e.g., customer data, etc.) as input to the trained AI model (e.g., model 160A) and runs the trained AI model (e.g., model 160A) on the input to obtain one or more outputs.

In some embodiments, confidence data can include or indicate a level of confidence of that a particular output (e.g., output(s)) corresponds to one or more inputs of the AI model (e.g., trained AI model). In one example, the level of confidence is a real number between 0 and 1 inclusive, where 0 indicates no confidence that output(s) corresponds to a particular one or more inputs and 1 indicates absolute confidence that the output(s) corresponds to a particular one or more inputs. In some embodiments, confidence data can be associated with inference using an AI model.

In some embodiments, an AI model, such as model 160A, may be (or may correspond to) one or more computer programs executed by processor(s) of server machine 140 and/or server machine 150. In other embodiments, an AI model may be (or may correspond to) one or more computer programs executed across a number or combination of server machines. For example, in some embodiments, AI models may be hosted on the cloud, while in other embodiments, these AI models may be hosted and perform operations using the hardware of a client device 111. In some embodiments, the AI models may be a self-hosted AI model, while in other embodiments, AI models may be external AI models accessed by an API.

In some embodiments, server machines 130 through 150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to one or more data items of the SaaS management platform 120. The SaaS management platform 120 can also include a website (e.g., a webpage) or application back-end software that can be used to provide users with access to the SaaS management platform 120.

In some embodiments, one or more of server machine 130, server machine 140, server machine 150, model 160A, or model 160N can be part of SaaS management platform 120. In other embodiments, one or more of server machine 130, server machine 140, server machine 150, or model 160A, or model 160N can be separate from SaaS management platform 120 (e.g., provided by a third-party service provider).

Also as noted above, for purpose of illustration, rather than limitation, aspects of the disclosure describe the training of an AI model (e.g., model 160A) and use of a trained AI model (e.g., model 160A). In other embodiments, a heuristic model or rule-based model can be used as an alternative. It should be noted that in some other embodiments, one or more of the functions of SaaS management platform 120 can be provided by a greater number of machines. In addition, the functionality attributed to a particular component of the SaaS management platform 120 can be performed by different or multiple components operating together. Although embodiments of the disclosure are discussed in terms of beauty products platforms, embodiments can also be generally applied to any type of platform or service.

In situations in which the systems discussed here collect personal information about users, or can make use of personal information, the users of client devices 111 can be provided with an opportunity to control whether or how the SaaS management platform 120 collects user information. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the SaaS management platform 120.

Figure 2A:
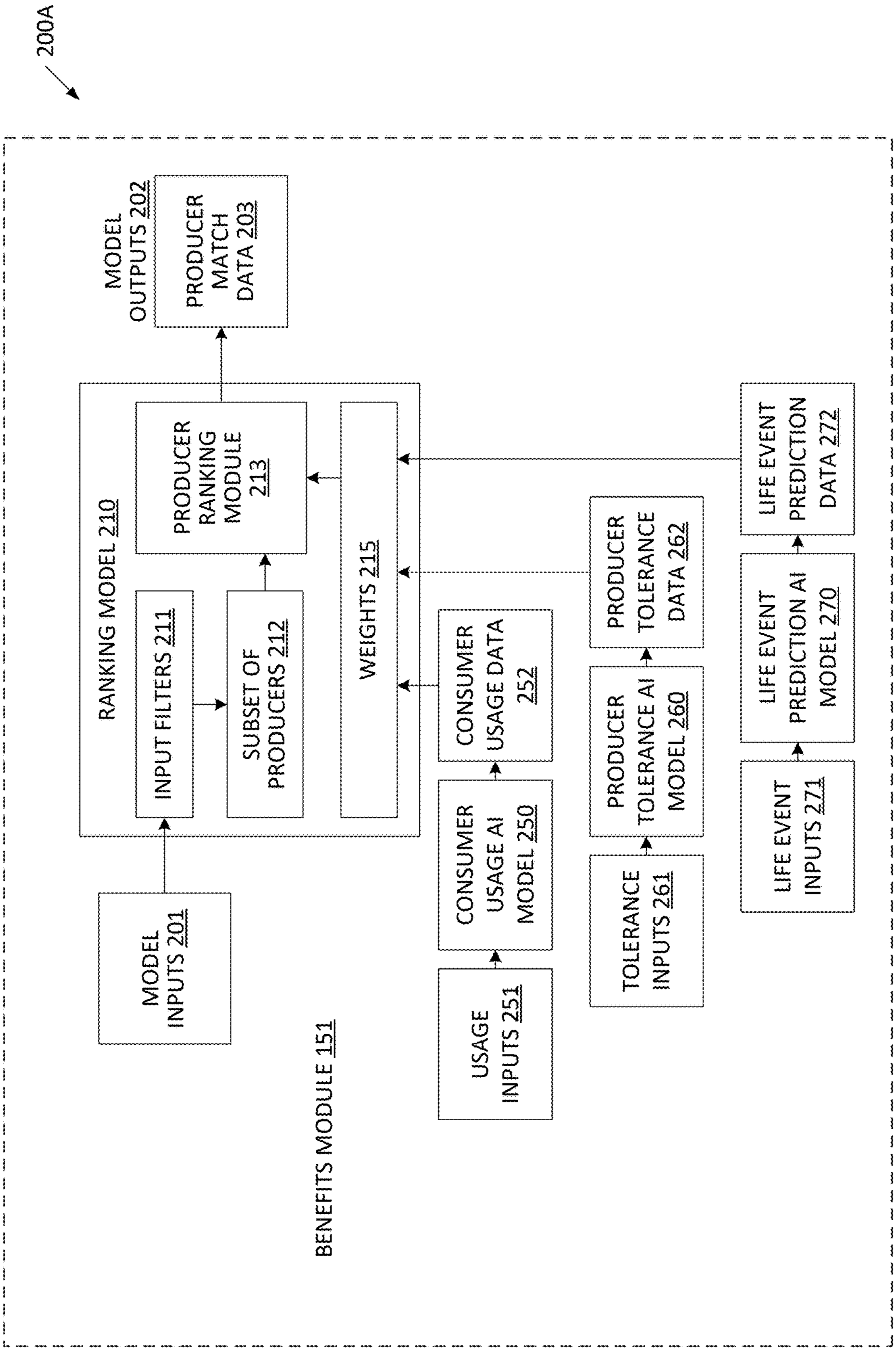
FIG. 2A illustrates an example system flow for using trained AI models to identify producer match data, in accordance with some embodiments of the disclosure.

FIG. 2A illustrates an example system flow 200A for using trained AI models to identify producer match data 203, in accordance with some embodiments of the disclosure.

A ranking model 210 can use model inputs 201 to produce producer match data (e.g., model outputs 202). The producer match data can include a ranked list of a subset of producers 212. The ranked list can be ranked on scores that indicate a certain producer is a match for the consumer. For example, the ranking model 210 can indicate that Producer A has a high match score with the consumer, and can be listed above Producer B which has a lower match score with the consumer. In some embodiments, as further described below, the ranked list of the producer match data 203 can be ranked using one or more weights 215. These weights 215 can be generated or informed by one or more AI models, as illustrated. In some embodiments, one or more of the weights 215 can be generated from consumer usage data 252 obtained from a first trained AI model (e.g., consumer usage AI model 250). In some embodiments, one or more of the weights 215 can be generated from producer tolerance data 262 obtained from a second trained AI model (e.g., producer tolerance AI model 260). In some embodiments, one or more of the weights 215 can be generated from life event prediction data 272 obtained from a third trained AI model (e.g., life event prediction AI model 270).

In some embodiments, the ranking model 210 receives model inputs 201 and produces model outputs 202. In some embodiments, the ranking model 210 can include a recommendation engine. For example, the ranking model 210 can receive the model inputs 201, and perform one or more algorithmic operations on the model inputs 201 to generate the model outputs 202.

In some embodiments, the ranking model 210 can use additional information to set or adjust weights 215 used by the ranking model 210 to generate the model outputs 202. In some embodiments, this additional information can include one or more of consumer usage data 252, producer tolerance data 262, or life event prediction data 272. In some embodiments, the consumer usage data 252 can be generated by the consumer usage AI model 250, based on usage inputs 251. In some embodiments, the producer tolerance data 262 can be generated by the producer tolerance AI model 260, based on tolerance inputs 261. In some embodiments, the life event prediction data 272 can be generated by the life event prediction AI model 270, based on life event inputs 271.

In some embodiments, the ranking model 210 can implement one or more input filters 211 to filter, among multiple producers, a subset of producers that may be a possible match for a particular consumer. In some embodiments, ranking model 210 can implement a set of rules for filtering. For example, some producers may not provide services to a location at which the consumer operates, and such producers can be removed as possible match for a particular consumer. In another example, some producers may not provide the type of services that the consumer prefers. For instance, the consumer might be seeking a health maintenance organization (HMO) healthcare plan, and the producer may only provide a preferred provider organization (PPO) healthcare plan. The initial subset of producers can be ranked such that a higher ranking indicates a better estimated match between consumer and producer than a lower ranking. The ranking of the subset of producers can be informed or modified by particular weights, such as weights 215. The outputs of one more AI models (e.g., AI models 250, 260, and 270) can be used to generate and/or adjust weights. The output of the AI models can reflect characteristics (e.g., different characteristics) that can affect the determination of whether a consumer and producer are potential matches (e.g., affect the ranking of the producer). In some embodiments, the use of AI models can help make accurate predictions where information, such as producer criteria information, is unknown.

For example and in some embodiments, consumer usage AI model 250 can produce an output indicating a likelihood that the first consumer will consume the services (e.g., use benefits) provided by each of the producers. In some embodiments, the likelihood that the that the first consumer will consume the services (e.g., use benefits) provided by each of the producers can include an estimate of an amount and/or type of services the first consumer will consume. For instance, the output can estimate the number of claims (e.g., insurance claims) the first consumer will file and the types of claims (e.g., what services are requested by the claims). For example and in some embodiments, producer tolerance AI model 260 can produce an output that indicates an estimate that a response from a producer for a request for services will satisfy consumer preferences (e.g., benefits offered, cost, etc.). For instance, the output of producer tolerance AI model 260 can identify whether the proposal for services (e.g., including cost for services) will be high relative to other insurance carriers. The producer tolerance AI model 260 can infer producer criteria for generating proposal based on historical data representing consumers and past proposals from the carrier. For example and in some embodiments, the life event prediction AI model 270 can produce an output that indicates an estimate of occurrences of future life events (e.g., marriage, children, etc.) of employees that affect services consumed by the consumer. For example, the future events can influence the insurance services consumed by employees of an organization. In some embodiments, the outputs of the AI models can be weighted accordingly to generate a ranked subset of producers for a corresponding consumer. In some embodiments, the outputs of the AI models can affect the weights of different producers the same or differently.

In some embodiments, each producer of the ranked subset of producers can be associated with a particular score determined by the ranking model 210. In some embodiments, producer(s) that satisfy a threshold score (e.g., have a score greater or equal to the threshold score) can be determined to be a sufficient match for the particular consumer. In some embodiments, the top n-number of producer(s) based on score (e.g., top three producers) can be determined to be a sufficient match for a particular consumer. In some embodiments, SaaS management platform 120 can send to the subset of producers a request for services on behalf of the consumer. In some embodiments, SaaS management platform 120 can send the producers selected among the ranked subset of the producers a request for services on behalf of the consumer. In some embodiments, the request can include or indicate consumer data, as described herein. In some embodiments, SaaS management platform 120 can receive one or more responses from the producers detailing the available services for the consumer based on the provided consumer data. In some embodiments, the SaaS management platform 120 can aggregate the responses and provide a notification to the customer indicating the aggregate responses from the producers.

In some embodiments, the model inputs 201 can include one or more of consumer data 220 and producer data 230A through producer data 230N. As described above, consumer data (e.g., consumer data 220) can describe information associated with, derived from, or describing a consumer, and can include information such as one or more of organization data, demographic data, benefits usage data, consumer preference data, forecasted consumer data, or consumer cluster data. As described above, producer data (e.g., producer data 230) can refer to information associated with, derived from, or describing a producer, and can include information such as one or more of benefits data, trend data, relationship data, or forecasted producer data. In some embodiments, the SaaS management platform (e.g., SaaS management platform 120 of FIG. 1) maintains the consumer data 220 and/or producer data 230A through producer data 230N. In some embodiments, some or all of the consumer data 220 is obtained from a respective consumer. In some embodiments, some or all of the producer data 230A is obtained from a respective producer.

In some embodiments, the model outputs 202 include producer match data 203. In some embodiments, the producer match data 203 can identify a subset of producers 212 and/or a score associated with each producer. The score can indicate a degree to which a producer and consumer match.

In some embodiments, the ranking model 210 includes one or more elements such as input filters 211, a subset of producers 212, a producer ranking module 213, or weights 215. The elements of the ranking model 210 can be used to transform the model inputs 201 into the model outputs 202.

In some embodiments, the input filter 211 can identify producers (e.g., associated with producer data 230A through producer data 230N, respectively) that are not aligned with a particular consumer (e.g., associated with consumer data 220). For example, and in some embodiments, given a set of producers that correspond to producer data 230A through producer data 230N, the input filter 211 can remove one or more producers from the set of producers based on one or more criteria (e.g., set of rules) that are evaluated at the input filter 211. In some embodiments, the one or more criteria can include threshold or considerations for one or more of location(s) of consumer facilities, information regarding current producer providing products and/or services to the consumer, an employee population distribution, information pertaining to benefits services consumed by the consumer, financial information of the consumer, information pertaining to usage of benefits services by the consumer, information pertaining to benefits systems used by the consumer, consumer short-term goals, consumer long-term goals, specific consumer requests, anticipated geographic expansion by the consumer, anticipated financial growth of the consumer, employee survey results from the consumers, or the like.

In some embodiments, location information pertaining to a consumer (e.g., location data) (which can be identified in or by consumer data 220 and/or pertains to a particular consumer) can be evaluated by the input filters 211 against one or more criteria of a producer and pertaining to: headquarters location, employee population location, employee headcount based on location, or the like. In some embodiments, if the location information pertaining to a consumer does not satisfy a criteria of a producer, the producer can be filtered from the subset of producers. For example, the location of consumer facilities, such as a headquarters of the consumer can determine what type of insurance coverage a producer can provide. If the producer cannot provide the type of coverage requested by the consumer at the location of the headquarters, the producer does not qualify for the subset of producers. In another example, some producers may only be licensed to provide insurance coverage when facilities of a consumer are located in certain areas (e.g., certain states). In an example, if the location of employees (or a percentage of employees) live outside of a covered area, the producer does not qualify for the subset of producers. In another example, if the employee headcount in a particular location is under a threshold, the provider will not provide services to the location and does not qualify for the subset of producers.

In some embodiments, information pertaining to a current provider that provides services to the consumer (e.g., benefit services data) (which can be identified in or by consumer data 220 and/or pertains to a particular consumer, or which can be identified in or by producer data 230 and/or pertains to a particular producer) can be evaluated by the input filters 211 against one or more criteria of a producer and pertaining to: renewing a service contract with the producer, whether a response from the producer to a request can be compared against other response from other producers, an availability of products and/or services of the current producer, a quantity of products and/or services that can be provided by a producer, a length of time the consumer has consumed services from the producer, bundling discounts that the producer can, or may provide, a quantity of employees of the consumer that will consume products and/or services from the producer, or the like. In an example, if an insurance carrier is providing insurance services to a customer, it is likely that it would be easier for the customer to continue to use the services provided by the insurance carrier. There may be financial or temporal costs to switching to a new insurance carrier that may outweigh potential benefits to moving to a new insurance carrier (e.g., a new producer).

In some embodiments, the employee population distribution (e.g., organization data) can be evaluated by the input filters 211 against one or more criteria of a producer pertaining to: employee population location, location requirements set by the producer, products and/or services' restrictions from the producer, a quantity of employees of the consumer that will consume products and/or services from the producer, or the like. In an example similar to the facilities location requirements described above, an insurance carrier may have government regulations that require a certain employee population distribution in certain locations, which can influence the type of insurance services that the insurance carrier can provide to a consumer. In another example, the insurance carrier may determine to restrict certain insurance carriers to certain geographic locations. For instance, home insurance carriers in California may selectively provide wildfire insurance to homes in areas with a high risk of wildfire.

In some embodiments, the information pertaining to benefit services consumed by the consumer (e.g., benefits service data) can be evaluated by the input filters 211 against one or more criteria of a producer pertaining to: employee population location, location requirements, product and/or services restrictions from the producer, or the like. In an example, an insurance carrier may provide certain amenities or improvements to insurance services in certain geographic areas, based on one or more of external economic factors, or government regulations.

In some embodiments, financial information of the consumer (e.g., financial data) can be evaluated by the input filters 211 against one or more criteria of the producer pertaining to: location requirements, employee cost data, or the like. In an example, an insurance carrier may provide insurance services to a consumer with certain financial benchmarks. Depending on the location of the employees of the consumer, the facilities of the consumer, or the like, the insurance carrier may have higher threshold requirements for the certain financial benchmarks of the consumers.

In some embodiments, consumer short-term or long-term goals (e.g., consumer preference data) can be evaluated by the input filters 211 against one or more criteria of the producer pertaining to: employee cost data, customer service data about the producer, a relative cost score (e.g., a perceived cost score of the producer in comparison to other producers), or the like. In some embodiments, the consumer preference data can be based on employee survey results from the consumer. In some embodiments, the consumer preference data can include specific consumer requests. For example, a consumer can explicitly request to not be matched to a certain insurance carrier. In some embodiments, short-term or long-term consumer goals can include geographic or financial expansion plans.

In some embodiments, the criteria for the input filters 211 are provided by the consumer. In some embodiments, the consumer can request a provider that provides a particular level of service and/or services at a particular cost level. If any producers do not satisfy the consumer provided criteria, the producers do not qualify for the subset of producers.

In some embodiments, the subset of producers 212 can be provided to the producer ranking module 213. In some embodiments, the subset of producers can be organized by a match correspondence to a consumer (e.g., associated with consumer data 220). That is, the subset of producers 212 can be organized (e.g., "ranked") by the producer ranking module 213 based on a degree of confidence that a given producer (corresponding to producer data 230A or producer data 230N) of the subset of producers is a match for the consumer.

As described above, in some embodiments, one or more weights 215 can be used by the producer ranking module 213 to rank the subset of producers 212.

In some embodiments, the consumer usage data 252 can affect one or more of the weights 215. In some embodiments, the consumer usage data 252 can be generated by a trained AI model, such as the model 160A or model 160N as described with reference to FIG. 1. This model, illustrated in FIG. 2A as consumer usage AI model 250, can generate the consumer usage data 252 from the usage inputs 251. The usage inputs 251 can include one or more of consumer data, or external factor data.

The consumer usage AI model 250 can be trained to generate consumer usage data 252. The consumer usage data 252 can reflect a predicted usage of a producer's product and/or services (e.g., benefits services) by the consumer. For example, consumer usage data estimate how many insurance claims (e.g., an average) a consumer will file in the future. In some embodiments, the predicted usage of a producer's product and/or services in the consumer usage data 252 can be based on information provided by, or about the consumer, such as consumer data 220. In some embodiments, the predicted usage of a producer's product and/or services in the consumer usage data can be based on additional data, such as information reflecting data obtained from external sources. Additional details regarding the usage inputs 251 are described below with reference to FIG. 2C.

In some embodiments, the producer tolerance data 262 can affect one or more of the weights 215. In some embodiments, the producer tolerance data 262 can be generated by a trained AI model, such as the model 160A or model 160N as described with reference to FIG. 1. This model, illustrated in FIG. 2A as producer tolerance AI model 260, can generate the producer tolerance data 262 from the tolerance inputs 261. The tolerance inputs 261 can include one or more of consumer data 220, producer data 230, or external factor data. In some embodiments, the tolerance inputs 261 can include consumer data 220 for multiple consumers that have previously requested one or more of products or services from the producer associated with the producer data 230. In some embodiments, the tolerance inputs 261 can include consumer data 220 for multiple consumers that had previously received responses from the producer associated with the producer data 230 for one or more products or services. In some embodiments, the tolerance inputs 261 can include consumer data 220 for multiple consumers that had previously consumed services from the producer associated with the producer data 230.

The producer tolerance AI model 260 can be trained to generate producer tolerance data 262. The producer tolerance data 262 can reflect an estimate that a response from a producer to a request for services for the first consumer will satisfy consumer preferences of the consumer associated with the consumer data 220. For example, a producer may be unwilling to provide insurance services at a relatively low cost to a consumer in a high-risk industry. For instance, a consumer in the business of recovering undetonated bombs can be a relatively high risk consumer to insure, due to the high risk of potential injury or death to a likely relatively young demographic. In the current example, the tolerance data can estimate that response from the producer in unlikely to satisfy consumer preferences (due to the relatively high cost of the services). In another example, a producer may have ideal risk levels corresponding to the types of consumers, or consumer demographics, and if a new consumer would upset those ideal risk levels, the producer may wish to charge a high cost for services to the consumer. For instance, a producer may have an ideal risk level that describes providing insurance coverage to 60% large corporations, 25% medium corporations, and 15% small corporations. If a small corporation (e.g., consumer) is seeking insurance coverage from the producer that would upset the ideal risk level for the producer, the producer may charge the consumer a higher cost for insurance coverage than if the small consumer were helping the producer meet the ideal risk level of the producer. The ideal risk level of the producer may be unknown to the agent but may be inferred by the producer tolerance AI model 260. In the current example, the tolerance data can estimate that response from the producer in unlikely to satisfy consumer preferences (due to the relatively high cost of the services). In some embodiments, the estimate can be based on information provided by, or about the producer, such as producer data 230. In some embodiments, the estimate can be based on information provided by, or about consumers that have previously used, or received responses to requests for services from the producer, such as consumer data 220. In some embodiments, the estimate can be based on additional data, such as information reflecting data obtained from external sources. Additional details regarding the tolerance inputs 261 are described below with reference to FIG. 2C.

In some embodiments, the life event prediction data 272 can be generated by a trained AI model, such as the model 160A or model 160N as described with reference to FIG. 1. This model, illustrated in FIG. 2A as life event prediction AI model 270, can generate the life event prediction data 272 from life event inputs 271. The life event inputs 271 can include one or more of consumer data 220, historical life event data (e.g., for employees of the consumer), or statistical life event data.

The life event prediction AI model 270 can be trained to generate the life event prediction data 272. The life event prediction data 272 can indicate an estimate of occurrences of employees' future life events that affect the services consumed by the consumer (e.g., by employees of the consumer). For example, if a certain life event happens to an employee of a consumer, the employee may be able to change the type of services that they receive from the producer via the consumer. For instance, if an employee of the consumer has a child, the employee may be able to change the health benefit services they receive from the producer via the consumer to include health benefit services for the new child. In some embodiments, the estimate of the occurrences of employees' future life events can be based on information provided by, or about the consumer (e.g., consumer data 220, historical life event data, etc.). In some embodiments, the estimate of the occurrences of employee's future life events can be based on external information provided about life events of a population (e.g., statistical life event data). Additional details regarding the tolerance inputs 261 are described below with reference to FIG. 2C.

In some embodiments, the benefits module 151 can obtain model inputs 201 about a first entity from a second entity. For example, and in some embodiments, the benefits module 151 can obtain a portion of the model inputs 201 about a consumer 110A from one or more of producer 170A-170N, another consumer (e.g., a consumer 110N, not illustrated), the SMP services 129 or an external third-party. In another example, and in some embodiments, the benefits module 151 can obtain a portion of the model inputs 201 about a producer 170A-170N from one or more of a consumer 110A-110N, another producer 170A-170N, the SMP services 129 of FIG. 1 or an external third-party. For example, and in some embodiments, the benefits module 151 can use an API to access a portion of the model inputs 201 from one or more of the consumer 110A, the producers 170A-170N, or the SMP services 129.

In some embodiments, one or more of the consumer 110A, the producers 170A-170N, or SMP services 129 (or a component of SMP services 129) can provide portions of one or more of consumer data 220 or producer data 230A-230N to the benefits module 151. In some embodiments, the SaaS management platform 120 can generate some or all of one or more of the consumer data 220 or the producer data 230A-230N.

In some embodiments, the model inputs 201 can be preprocessed before being provided to the ranking model 210. For example, preprocessing of the model inputs 201 can remove financial data from the consumer data 220. In some embodiments, preprocessing can include anonymization of consumer or employee information. In some embodiments, preprocessing of the model inputs 201 can include one or more changes to the model inputs 201 based on one or more criteria. In some embodiments, the processing of the model inputs 201 at can be performed based on one or more characteristics of the SaaS management platform 120. In some embodiments, preprocessing of the model inputs 201 can be performed based on one or more characteristics of the consumer 110A. In some embodiments, the preprocessing of the model inputs 201 can be performed based on one or more characteristics of a producer 170A.

In some embodiments, the benefits module 151 can provide a notification indicating the model outputs 202 (e.g., a notification identifying the output) to the SMP services 129 of the SaaS management platform 120. In some embodiments, the benefits module 151 can provide a notification indicating the model outputs 202 as output data to the consumer associated with the consumer data 220. In alternative embodiments, the benefits module 151 can provide the model outputs 202 to the benefits module 151 for post-processing.

In some embodiments, the benefits module 151 can perform one or more post-processing operations on the model outputs 202. In some embodiments, the post-processing can generate an indication of producer match data 203. For example, and in some embodiments, post-processing can transform raw data from the model outputs 202 into a human-readable indication of the model outputs 202.

In some embodiments, the model outputs 202 is provided to the consumer 110A as a notification that includes one or more producers identified in the producer match data 203 and/or a score for each of the producer(s) indicating a likelihood (or degree to which) the identified producer is a match for the consumer 110A. For example, the notification can identify the model outputs 202 as a list of producers and corresponding producer score for each of the producer(s) indicating a likelihood that the identified producers are a match for the consumer 110A.

In some embodiments, a notification related the model outputs 202 can be provided to one or more of the producers 170A-170N that are identified in the producer match data 203 The notification to the producers 170A-170N identified in the producer match data 203 can include a request for a proposal to provide products and/or services to the consumer 110A. In some embodiments, the notification can include portions of one or more of consumer data 220 or producer data 230A. For example, the notification can include consumer data 220 and relationship data (of the producer data 230A corresponding to the particular producer).

In some embodiments, the SMP services 129 can generate a notification identifying the model outputs 202. The notification can be made available to to one or more of the consumer 110A, or one or more producers 170A-170N. In some embodiments, the notification can identify a particular producer, a list of producers 170A-170N, one or more producer scores, or the like.

In some embodiments, the benefits module 151 can determine whether a producer score of satisfies a threshold criterion (e.g., threshold score). In some embodiments, the threshold criterion can be configured based on information received from one or more of a consumer 110A-110N, a producer 170A-170N, or generated by the SaaS management platform 120. In some embodiments, responsive to determining the producer score satisfies the threshold criterion, the benefits module 151 can generate notifications for one or more of the producer, the consumer, or the SaaS management platform 120. For example, and in some embodiments, the benefits module 151 can generate a notification including the model outputs 202 for a producer to request information pertaining to products and/or services that may be provided by the producer to the consumer. In some embodiments, the benefits module 151 can generate a notification including model outputs 202 for each producer 170A-170N identified in the producer match data 203. In some embodiments, the benefits module 151 can sort the producers 170A-170N that are identified in the producer match data 203 based on the respective producer scores.

In some embodiments, the model outputs 202 can be presented in various mediums, such as in a file, as a pop-up, a message (e.g., an email message, a text message, or a message within an application), or as an alert. In another example, a user of one or more of the the SaaS management platform, the consumer 110A, or the producer 170A-170N can be presented with an email message including a textual description of the model outputs 202 (e.g., the indication of producer match data 203).

It can be noted that the subset of producers 212 are shown as being ranked for purposes of illustration rather than limitation. In other embodiments, the set of producers can be ranked, and a subset of producers can be determined based on the ranking. For instance, all producers below a threshold score can be filtered from the set of producers.

Figure 2B:
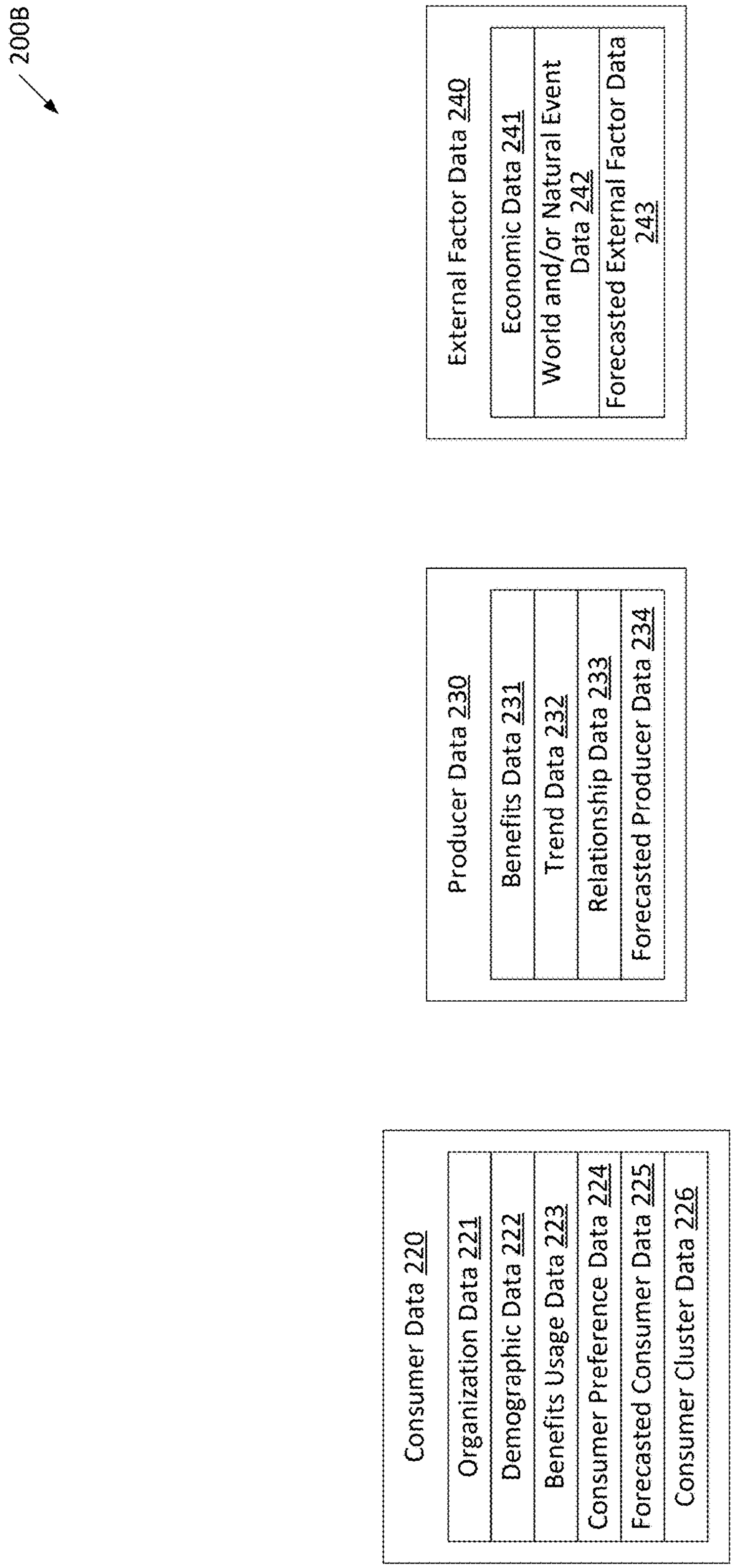
FIG. 2B illustrates various inputs for the ranking model, the consumer usage AI model 250, the producer tolerance AI model, and the life event prediction AI model.

FIG. 2B illustrates various inputs 200B for the ranking model 210, the consumer usage AI model 250, the producer tolerance AI model 260, and the life event prediction AI model 270. The inputs 200B are described here and as noted in the description of subsequent figures, particular inputs of inputs 200B can be used for each of the ranking model 210, the consumer usage AI model 250, the producer tolerance AI model 260, and the life event prediction AI model 270.

In some embodiments, consumer data 220 includes one or more of organization data 221, demographic data 222, benefits usage data 223, consumer preference data 224, forecasted consumer data 225, or consumer cluster data 226.

As described above, consumer data 220 can include one or more of information that describes the consumer or the employees thereof (e.g., organization data 221, or demographic data 222), information derived from consumer activities (e.g., benefits usage data 223), or information provided by the consumer to the SaaS management platform. In some embodiments, a first consumer data 220A, and an nth consumer data 220N can be provided as inputs. For example, consumer data 220A can be associated with a first consumer, and nth consumer data 220N can be associated with an nth consumer. In some embodiments, consumer data 220 includes one or more of organization data 221, demographic data 222, benefits usage data 223, consumer preference data 224, or the like.

Organization data 221 can include information that describes the consumer. For example, and in some embodiments, organization data 221 can include one or more of location data, employee data, financial data, or consumer sector data.

Location data can include information that identifies geographic positions or physical locations relevant to the operations, activities, assets, or employees of a consumer. In some embodiments, location data includes one or more of (i) a physical, logistical, and/or incorporation location of a consumer's headquarters, (ii) physical locations of consumer facilities or operations, (iii) the residential location of consumer employees (e.g., State A, or State B), (iv) the working location of consumer employees, (v) or similar location-based metrics.

Employee data can include information related to individuals employed by the consumer (e.g., organization personnel). In some embodiments, employee data includes one or more of employee details (e.g., job position, employment status, location, in-office or in-home work status), compensation and benefits, leave and attendance, and so forth. In some embodiments, employee data can be related to an aggregate of some, or all the individuals employed by the consumer. For example, employee data can include headcount or average age of the employees, etc. In another example, employee data can include the number of employees of a consumer that work onsite versus the number of employees of the consumer that work at home. For instance, if a relatively larger number of employees of the consumer work at home, a cost to the consumer for products and/or services from the producer may be relatively lower. In some embodiments, a producer can offer custom benefits package options for consumers with an employee headcount above a certain headcount threshold. For example, a producer can offer non-custom benefits package options to consumers with a headcount less three hundred employees, and custom benefits package options to consumers with a headcount greater than or equal to three hundred employees. In another example, consumers with five hundred or more employees may allow for consideration of stop-loss or self-insurance options.

Financial data can include information that describes financial activities of the consumer. In some embodiments, financial data includes information such as one or more of revenue data, expense data, salary data, asset data, liability data, profitability data, cash flow data, funding data (e.g., funding round data), other financial funding data, or the like. For example, large funding rounds at a startup can indicate that the startup (e.g., the consumer) will prefer to have a "richer" benefits package. As used herein, a "richer" benefits package refers to a benefits package that has more robust features, services, and/or products. In another example, a large funding round can indicate that the consumer will not prioritize cost-savings strategies when selecting a producer to provide products and/or services. In another example, a smaller round of funding can indicate that the consumer will prioritize cost-savings strategies when selecting the producer to provide products and/or services. In some embodiments, financial data can include information regarding the amount, and/or type of payment made by a consumer to a current producer for products and/or services. For example, a consumer can be receiving products and/or services from a current producer while simultaneously seeking a new producer from whom to obtain products and/or services.

Consumer sector data can include information related to a sector or industry(ies) served by the consumer. In some embodiments, the consumer sector data can describe the sector serviced by the consumer and activities or events external to the consumer that may affect the consumer, but are not necessarily controlled by the consumer. In some embodiments, consumer sector data includes one or more of statistics, performance data, trends, and/or characteristics of other organizations within the same consumer sector as a particular consumer. For example, consumer sector data can include competitor information. In another example, consumer sector data can identify the consumer sector, e.g., the "venture capital sector" or the "tech sector."

Demographic data 222 can include information that describes characteristics (e.g., demographic characteristics) of personnel associated with the consumer (e.g., employees of the consumer). In some embodiments, demographic data 222 includes one or more of age, gender, family status (e.g., marital status, number of dependents, and the like), job title, salary, residential location, or the like. In some embodiments, demographic data can be used to understand the employees of an organization in aggregate without using personally identifiable information of individual employees.

Benefits usage data 223 can include information that describes a consumer's usage of products and/or services provided by a producer. For example, and in some embodiments, benefits usage data 223 can include or identify one or more of (i) the product(s) and/or service(s) provided to the consumer by the producer, (ii) the usage of the product(s) and/or service(s) by the consumer, and (iii) forecasted usage of product(s) and/or service(s) by a consumer in the future (e.g., within a time period). For example, the carrier can provide the consumer with one hundred hours of services (e.g., identified service), but the consumer may only use fifty hours of the service provided by the carrier (e.g., usage rate of 50%). In another example, a producer can provide employees of the consumer with an out-of-pocket maximum of $3,000 for health-related expenses, but the employee of the consumer may actually spend $7,000 on health-related expenses (representing $4,000 of unused health-related expenses). In some embodiments, the benefits usage data 223 can reflect a historical usage of products and/or services provided by one or more of the producer, or another producer.

Consumer preference data 224 can include information that reflects consumer preference(s). In some embodiments, the consumer preference data 224 can be received from the consumer (e.g., via a client device). In some embodiments, the consumer preference data 224 can be derived from, or determined by the SaaS management platform (e.g., SaaS management platform 120). In some embodiments, the consumer preference data 224 can describe expectations of the consumer for products and/or service(s) provided by a producer. Consumer preference data 224 can include one or more of financial expectations, quality expectations, variety expectations, functional expectations, or the like. For example, financial expectations may be an expected cost of the products and/or services provided by a producer. In another example, financial expectations may be an expected cost savings by switching from a current producer to a new producer. In another example, quality expectations may include a threshold quality of the service provided by the producer. In another example, variety expectations may include requirements about the types (e.g., "variations") of the service(s) provided by the producer. In another example, functional expectations may include functional, or "system" requirements of the services provided by the producer in order for the consumer to effectively integrate the service. In some embodiments, one or more of expectations included in consumer preference data 224 can be satisfied by a particular service provided by a particular provider. In some embodiments, one or more expectations included in consumer preference data 224 may not be satisfied by a particular service provided by a particular provider.

Forecasted consumer data 225 can refer to information that estimates or predicts future outcomes, events, or trends related to a consumer. In some embodiments, forecasted consumer data 225 can be related to a specific time period. For example, the forecasted consumer data 225 can be for one year into the future. In another example, an analysis of consumer data 220 can indicate one or more trends that forecasts some value for the forecasted consumer data 225. In some embodiments, forecasted consumer data 225 can be associated with statistics or probabilities of one or more events happening, or not happening within the specified time period. For example, a weather forecast predicts a 90% chance of two inches of rain tomorrow. The forecasted data (two inches of rain) is likely to happen within a specified time period (tomorrow) with a 90% degree of confidence (a probability associated with the forecasted data). In some embodiments, forecasted consumer data 225 can be provided by the consumer (e.g., consumer 110A). In some embodiments, the forecasted consumer data 225 can be generated by the the SaaS management platform 120.

In some embodiments, the forecasted consumer data 225 includes forecasted organization data (e.g., forecasted values for the organization data 221). In some embodiments, forecasted organization data can include forecasted location data, forecasted employee data, forecasted financial data, or forecasted consumer sector data. For example, forecasted location data can include an anticipated opening (or closing) of a facility in, for instance, Hawaii or Utah or Texas. In another example, forecasted location data can include an anticipated shift towards- or away from remote work (e.g., working from home versus working onsite at a consumer facility). In another example, forecasted location data can include an anticipated global expansion (e.g., expansion of consumer organization into one or more countries). In another example, forecasted employee data can include an anticipated headcount growth from one-hundred employees to three-hundred or more employees over the next two years. In another example, forecasted employee data can include an anticipated headcount growth to five-hundred or more employees within the next year, which can trigger certain benefits package considerations (e.g., stop-loss or self-insurance considerations). In another example, forecasted financial data can include anticipated funding rounds or major influx of capital to- or outflow of capital from the consumer. In another example, forecasted consumer sector data can include information reflecting a major consumer sector disruption, for instance a financial collapse of a competitor or other consumers within the consumer sector.

In some embodiments, forecasted consumer data 225 includes forecasted demographic data. For example, forecasted demographic data can include information that identifies whether personnel of the consumer are trending older, towards marriage, or child-rearing ages. In another example, forecasted demographic data can include information reflecting a predicted need for fertility coverage, based on the overall age, gender representation, and health of employees of the consumer, as represented in the demographic data. In another example, forecasted demographic data can include information reflecting a predicted life event, such as a marriage or divorce, birth of a child, death of a family member, or other change in family members living in a household.

In some embodiments, forecasted consumer data 225 includes forecasted benefits usage data. For example, forecasted benefits usage data can include information that identifies whether personnel of the consumer are, for instance, likely to use benefits services related to having a child within the next year.

In some embodiments, forecasted consumer data 225 includes forecasted preference data. For example, forecasted preference data can include anticipated changes to a consumer's human resources (HR) management software provided by the consumer to personnel for managing respective benefit services provided by the producer.

Consumer cluster data 226 can reflect data generated by clustering the consumers 110A-110N, as described above with reference to FIG. 1. For example, consumer cluster data 226 can identify a particular cluster to which a consumer belongs (e.g., a cluster of consumers that share some characteristics). For instance, consumers of a cluster of consumers (e.g., a subset of the consumers 110A-110N) can be roughly the same size, have similar revenue, be located in similar geographic location(s) and so forth (e.g., share similar characteristics). The consumer cluster data 226 can include for example one or more of a cluster identifier that identifies a particular consumer cluster, a cluster membership reflecting the degree to which a consumer belongs to a particular cluster, a cluster centroid that identifies a representative "point" or average dataset for a particular consumer cluster, a value indicating a difference between a dataset of the consumer and the average dataset for a particular cluster, or the like. For example, consumer cluster data 226 can identify a consumer sector, such as, for example, the "tech" sector or "venture capital (VC)" sector. In some embodiments, the consumer cluster data 226 can identify one or more characteristics that are commonly shared (e.g., similar) across consumers (e.g., consumers 110A-110N) in the same consumer cluster. In some embodiments, consumer cluster data 226 can identify one or more characteristics of specific "adjacent consumers" (e.g., other consumers in the same consumer cluster).

In some embodiments, producer data 230 includes one or more of benefits data 231, trend data 232, relationship data 233, or forecasted producer data 234.

As described above, producer data 230 can include one or more of information that describes types of products and/or services provided by the producer (e.g., benefits data 231), information that describes cost trends (e.g., trend data 232), information about the producer derived by the first-party organization (e.g., relationship data 233), or the like. An nth producer data 230N can be provided as an additional training input. For example, producer data 230 can be associated with a first producer, and nth producer data 230N can be associated with an nth producer. In some embodiments, producer data 230A-230N includes one or more of benefits data 231, trend data 232, relationship data 233, or the like.

Benefits data 231 can include information that describes the products and/or services provided by a producer. In some embodiments, benefits data 231 can include information that describes the characteristics of the products and/or services offered by the producer. In some embodiments, benefits data 231 can include one or more of (i) information about the functionality of the product or service, (ii) cost of the product or service, (iii) information about the availability of the product or service, (iv) requirements to receive or use the product or service, or (v) any other metric related to products or services offered by the producer. In some embodiments, a producer can provide multiple services and/or multiple products, each with different characteristics.

Trend data 232 can include information that describes trends with respect to a producer. For example, and in some embodiments, the trend data 232 can identify cost trends for producer products and/or services, including specific costs of products and services provided by the producer. In some embodiments, the trend data 232 can include one or more of (i) information that reflects the cost of products and services provided by a particular producer in comparison with the cost(s) of comparable service(s) provided by other producer(s) in the sector, or (ii) information that reflects whether the cost of products and/or services provided by the particular producer for a particular product and/or service are increasing (e.g., the service is getting more expensive) or decreasing (e.g., the service is getting less expensive). For example, if the cost of products and/or services provided by the producer are higher than the cost of similar or comparable products and services by other producers in the sector, the trend data 232 of the producer can reflect a lower value (e.g., a higher cost for services in comparison to other producers). In another example, if a producer continues to provide the same type or level of service while decreasing (or alternatively, increasing) the cost of the service, the trend data 232 can reflect that the cost of services is decreasing (or increasing, respectively). In some embodiments, the trend data 232 can be different for different products and/or services provided by the producer.

Relationship data 233 can include information that reflects a relationship between the producer and another party, such as the SaaS management platform 120. In some embodiments, relationship data 233 reflects one or more of (i) a relationship between SaaS management platform and a particular producer, or (ii) a perceived relationship that a producer has with consumer(s) that consume or use products and/or services of the consumer. In some embodiments, relationship data 233 includes sentiment data that reflects a level of good- or ill-will between the producer and the SaaS management platform, or between the producer and a consumer(s). In some embodiments, relationship data 233 includes information that reflects a quantity of interactions between the producer and the SaaS management platform. In some embodiments, relationship data 233 is generated and maintained by the SaaS management platform (e.g., the first-party organization) based, for example, on one or more of interactions between the SaaS management platform and a producer, or observations by the SaaS management platform of interactions between the producer and one or more consumers. In some embodiments, relationship data 233 is based at least in part on information provided by the producer and/or information provided by one or more consumers.

Forecasted producer data 234 can refer to information that estimates or predicts future outcomes, events, or trends related to a producer. In some embodiments, forecasted producer data 234 can be similar to the forecasted consumer data 225, described above.

In some embodiments, the forecasted producer data 234 includes forecasted benefits data, forecasted trend data, or forecasted relationship data. For example, forecasted benefits data can include predicted benefits packages, or features of benefits packages that the producer is likely to continue to provide, or start/stop providing. In another example, forecasted trend data can include forecasted costs or cost trends for products and/or services provided by the producer. In another example, forecasted relationship data can reflect a preference by one or more of the agent (e.g., the SaaS management platform) or a particular producer to improve the relationship between the SaaS management platform and the particular producer.

In some embodiments, external factor data 240 can include one or more of economic data 241, world and/or natural event data 242, or forecasted external factor data 243.

As described above, external factor data 240 can include information that reflects one or more factors or variables, such as events, influences, or conditions that can impact one or more of a consumer or a producer. In some embodiments, the events, influences, or conditions can be external events, external influences, or external conditions. In some embodiments, the external factor data 240 can include one or more of economic data 241, world and/or natural event data 242, forecasted external factor data 243, or the like.

Economic data 241 can include information regarding to micro- or macro-scale economic indicators that pertain to one or more of a consumer sector, a producer sector, a particular consumer, a particular producer, consumer-producer relationships, or a particular consumer-producer relationship. For example, an economic indicator can be an inflation rate of a currency, such as the United States dollar. In some embodiments, economic data 241 can include producer sector data including information related to a sector or industry(ies) of the producer. In some embodiments, the economic data 241 can describe the producer sector or industry. For example, the economic data 241 of an insurance carrier can describe the insurance industry. In some embodiments, the economic data 241 can include one or more of statistics, performance data, trends, regulations, and/or characteristics of the producer industry.

World and/or natural event data 242 (also referred to herein as "world event data") can include information regarding social, cultural, political, or naturally-occurring events that pertain to one or more of a consumer sector, a producer sector, a particular consumer, a particular producer, consumer-producer relationships, or a particular consumer-producer relationship. For example, a political event can be a change in government policy, or political party dominance. In another example, a naturally-occurring event can be a disruptive avalanche, volcanic eruption, storm, earthquake, or the spread of an infectious disease.

Forecasted external factor data 243 can refer to information that estimates or predict future outcomes, events, or trends related to factors external to one or more of the consumer or producer. In some embodiments, forecasted external factor data 243 can be similar to the forecasted consumer data 225 or the forecasted producer data 234, described above.

In some embodiments, the forecasted external factor data 243 includes forecasted producer sector data, forecasted economic data, forecasted world and/or natural event data, or the like. For example, forecasted producer sector data can include information reflecting a major disruption in the producer sector, for instance a financial collapse of a competitor or other producer within the producer sector. In another example, forecasted economic data can include information reflecting a predicted inflation rate of a currency, such as the United States dollar. In another example, forecasted world and/or natural event data can include information reflecting a predicted regulatory framework or set of government policies that may apply to one or more consumers and/or one or more producers.

Figure 2C:
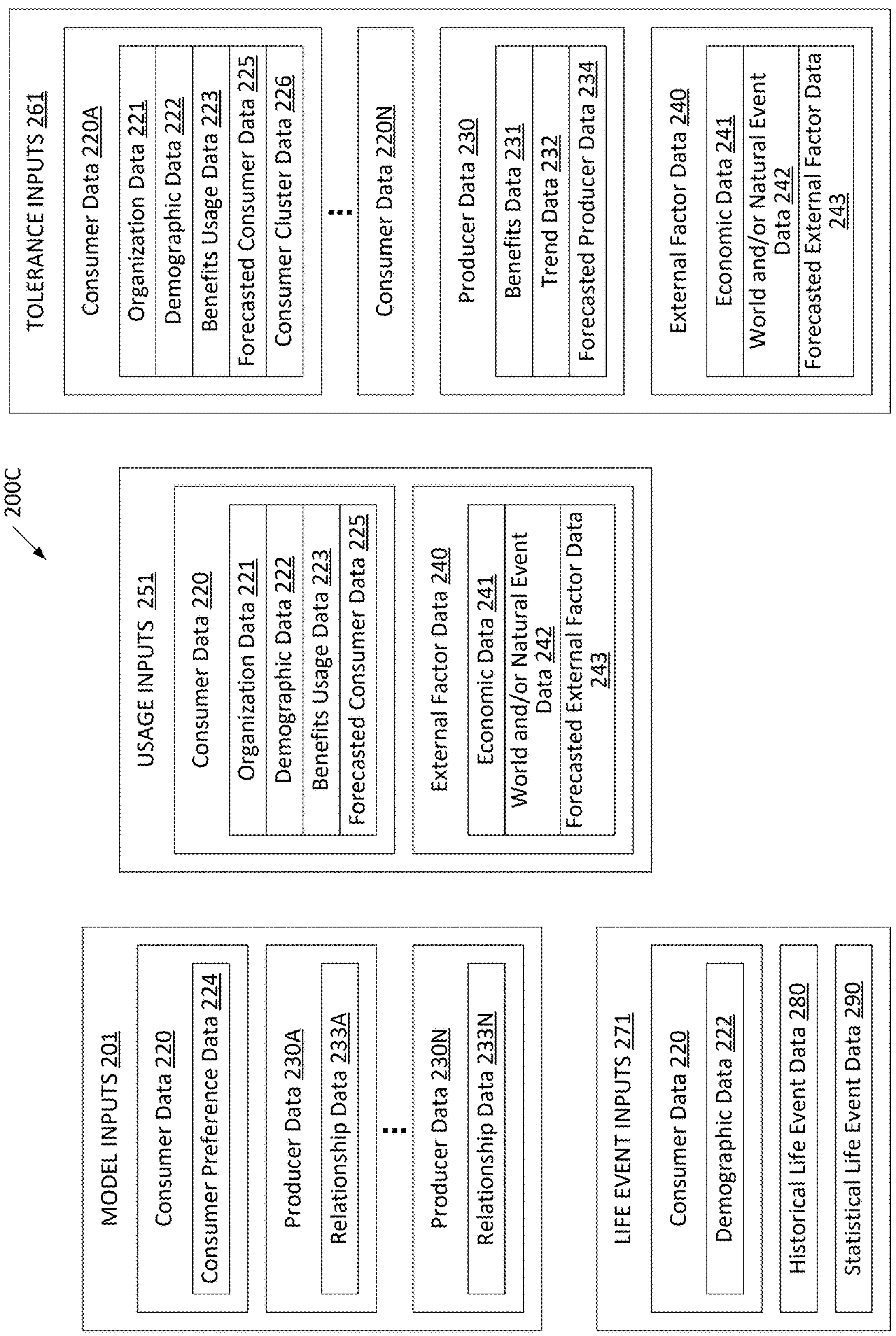
FIG. 2C illustrates specific inputs for the ranking model, the consumer usage AI model, the producer tolerance model, and the life event prediction AI model.

FIG. 2C illustrates specific inputs 200C for the ranking model 210, the consumer usage AI model 250, the producer tolerance model 260, and the life event prediction AI model 270, in accordance with some embodiments of the disclosure.

In some embodiments, the model inputs 201 include one or more of consumer data 220, producer data 230A, or producer data 230N.

In some embodiments, the consumer data 220 pertains to a consumer seeking services from one or more producers via the SaaS management platform 120 of FIG. 1. In some embodiments, the consumer data 220 of the model inputs 201 includes consumer preference data 224, as described above. In some embodiments, the consumer data 220 of the models input 201 can include additional data, as described above with reference to FIG. 2B.

In some embodiments, the producer data 230A pertains to a certain producer of the one or more producers that provide services via the SaaS management platform 120. Similarly, the producer data 230N pertains to another producer of the one or more producers that provide services via the SaaS management platform 120. In some embodiments, the producer data 230A and/or the producer data 230N can include relationship data 233A or relationship data 233N, respectively. In some embodiments, a set of producers can be determined from the one or more of the producer data 230A and the producer data 230N. In some embodiments, the producer data 230A and/or the producer data 230N can include additional data, as described above with reference to FIG. 2B.

In some embodiments, the usage inputs 251 can include one or more of consumer data 220, or external factor data 240.

In some embodiments, the consumer data 220 pertains to the consumer seeking services from the SaaS management platform 120. In some embodiments, the consumer data 220 of the model inputs 201 includes organization data 221, demographic data 222, benefits usage data 223, or forecasted consumer data 225. In some embodiments, the consumer data 220 of the models input 201 can include additional data, as described above with reference to FIG. 2B.

In some embodiments, the external factor data 240 pertains to one or more of the consumer seeking services from the SaaS management platform 120, or a producer providing services to consumers via the SaaS management platform 120. In some embodiments, the external factor data 240 includes one or more of economic data 241, world and/or natural event data 242, or forecasted external factor data 243.

In some embodiments, the tolerance inputs 261 can include one or more of consumer data 220A, consumer data 220N, producer data 230, or external factor data 240.

In some embodiments, the consumer data 220A pertains to a first consumer that has previously sought services from one or more producers via the SaaS management platform 120. In some embodiments, the consumer data 220N pertains to an nth consumer that has previously sought services from one or more producers via the SaaS management platform 120. In some embodiments, the consumer data 220A of the model inputs 201 includes organization data 221, demographic data 222, benefits usage data 223, forecasted consumer data 225, or consumer cluster data 226, as described above. In some embodiments, the consumer data 220 of the models input 201 can include additional data, as described above with reference to FIG. 2B. While not illustrated, it can be appreciated that consumer data 220N can include similar data as consumer data 220A.

In some embodiments, the producer data 230 pertains to a producer of the one or more producers that provide services via the SaaS management platform 120. In some embodiments, the producer data 230 can include one or more of benefits data 231, trend data 232, or forecasted producer data 234, as described above.

In some embodiments, the external factor data 240 pertains to one or more of the consumer seeking services from the SaaS management platform 120, or a producer providing services to consumers via the SaaS management platform 120. In some embodiments, the external factor data 240 includes one or more of economic data 241, world and/or natural event data 242, or forecasted external factor data 243.

In some embodiments, the life events inputs 271 can include one or more of consumer data 220, historical life event data 280, or statistical life event data 290.

In some embodiments, the consumer data 220 pertains to a consumer seeking services from one or more producers via the SaaS management platform 120. In some embodiments, the consumer data 220 of the life event inputs 271 includes demographic data 222, as described above. In some embodiments, the consumer data 220 of the life event inputs 271 can include additional data, as described above with reference to FIG. 2B.

In some embodiments, the historical life event data 280 can include life event data for employees of a consumer. For example, the life event data 280 can include an indication that a 29-year-old male added a new child dependent (e.g., the child was born to a female partner) to his family during the previous year. This information can be used, along with the demographic data and the statistical life event data 290 to predict life events for employees of the consumer generally. For example, it may be that employees of a consumer have similar life events at similar times, due to proximity, similarity of lifestyles, or other connections between employees of a consumer. In some embodiments, the statistical life event data 290 includes information that reflects statistical life event information for an average person within a predefined time period (e.g., at certain ages). For example, statistical life event data 290 can include information that reflects a statistical likelihood that a 25-year-old male is likely to get married within the next three years, or a statistical likelihood that a married couple is likely to get a divorce with the next three years. In another example, statistical life event data 290 can include information that reflects a statistical likelihood that a person capable of bearing children is likely to have a natural-born child within a year, or a statistical likelihood that any person is likely to adopt a child within a year.

It can be noted that in other embodiments, one or more of model inputs 201, usage inputs 251, tolerance inputs 261 and life event inputs 271 can include any of the inputs described with respect to FIG. 2B.

Figure 3:
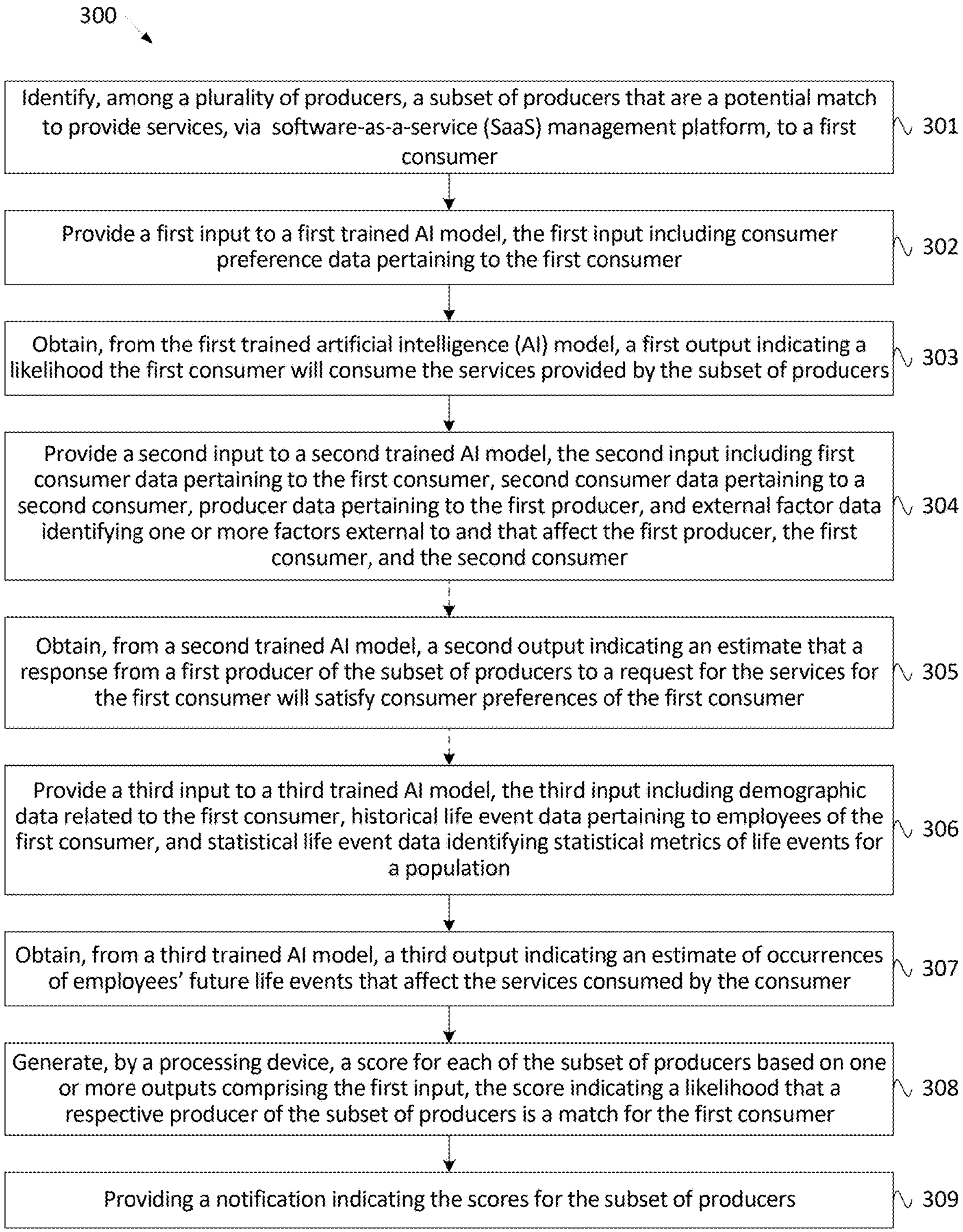
FIG. 3 illustrates a flow diagram of an example method for training an AI model to identify a producer-consumer match, in accordance with some embodiments of the disclosure.

FIG. 3 depicts a flow diagram of one example of a method 300 for using a ranking model to organize a subset of producers, in accordance with some embodiments of the disclosure. The method is performed by processing logic that can include hardware (circuitry, dedicated logic, etc.), software (e.g., instructions run on a processing device), or a combination thereof. In one embodiment, some or all the operations of method 300 can be performed by one or more components of system 100 of of FIG. 1. In other embodiments, one or more operations of method 300 can be performed by the benefits module 151 as described with reference to FIG. 1 through FIG. 2C. In some embodiments, one or more operations of method 300 can be performed by the ranking model 210. It can be noted that components described with respect to FIG. 1 through FIG. 2C can be used to help illustrate aspects of FIG. 3. In some embodiments, the operations (e.g., operations 301-309) can be the same, different, fewer, or greater.

At operation 301, the processing logic identifies, among multiple producers, a subset of producers that are a potential match to provide services, via a software-as-a-service (SaaS) management platform, to a first consumer. In some embodiments, the subset of producers is based on one or more criteria related to characteristics of the consumer and characteristics of the multiple producers that provide, via the SaaS management platform, one or more services.

At operation 302, the processing logic provides a first input to a first trained AI model. In some embodiments, the first input includes consumer preference data pertaining to the first consumer.

At operation 303, the processing logic obtains, from the first trained artificial intelligence (AI) model, a first output indicating a likelihood that the first consumer will consume the services provided by the subset of producers. In some embodiments, the processing logic provides a first input to the first trained AI model. The first input can include first consumer data related to the first consumer and external factor data identifying one or more factors external to and that affect the first consumer.

At operation 304, the processing logic provides a second input to a second trained AI model. In some embodiments, the second input includes one or more of first consumer data pertaining to the first consumer, second consumer data pertaining to a second consumer, producer data pertaining to the first producer, or external factor data identifying one or more factors external to and that affect the first producer, the first consumer, and the second consumer.

At operation 305, the processing logic obtains, from the second trained AI model, a second output indicating an estimate that a response from a first producer of the subset of producers to a request for the services for the first satisfy consumer preferences of the first consumer. In some embodiments, the processing logic provides a second input to the second trained AI model. The second input can include one or more of first consumer data pertaining to the first consumer, second consumer data pertaining to a second consumer, producer data pertaining to the first producer, and external factor data identifying one or more factors external to and that affect the first producer, the first consumer and the second consumer.

At operation 306, the processing logic provides a third input to a third trained AI model. In some embodiments, the third input includes one or more of demographic data related to the first consumer, historical life event data pertaining to employees of the first consumer, and statistical life event data identifying statistical metrics of life events for a population.

At operation 307, the processing logic obtains, from a third trained AI model, a third output indicating an estimate of occurrences of employees' future life events that affect the services consumed by the consumer. In some embodiments, the processing logic provides a third input to the third trained AI model. The third input can include one or more of demographic data related to the first consumer, historical life event data related to employees of the first consumer, and life event data identifying statistical metrics of life events for a population.

At operation 308, the processing logic generates, by a processing device, a score for each of the subset of producers based on one or more outputs comprising the first input, the score indicating a likelihood that a respective producer of the subset of producers is a match for the first consumer.

At operation 309, the processing logic provides a notification indicating the subset of producers and/or scores for the subset of producers.

Figure 4A:
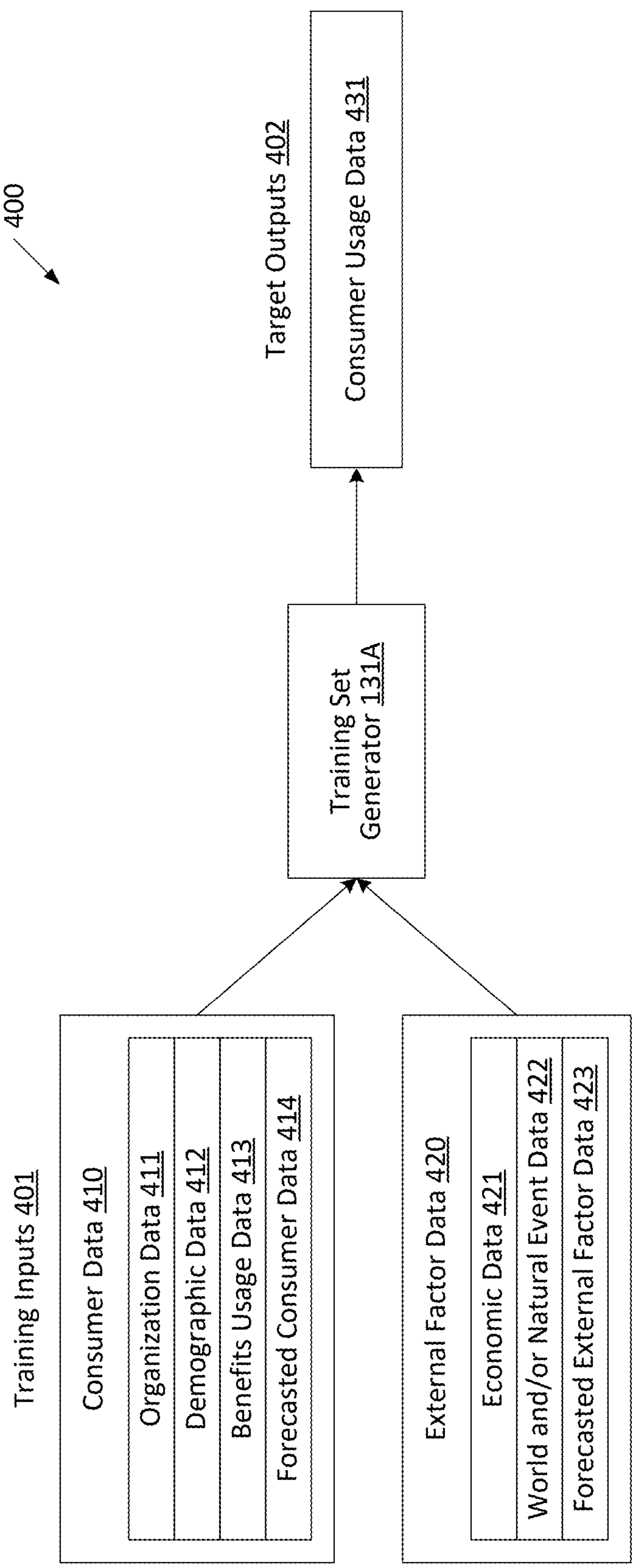
FIG. 4A is an example training set generator to generate training data for an AI model using information pertaining to one or more of consumer data and external factor data, in accordance with some embodiments of the disclosure.

FIG. 4A is an example training set generator to generate training data for an AI model using information pertaining to one or more of consumer data and external factor data, in accordance with some embodiments of the disclosure. System 400 shows a training set generator 131, training inputs 401, and target outputs 402. System 400 can include similar components as the system 100, as described in FIG. 1. Components described with reference to the system 100 of FIG. 1 can be used to describe the system 400 of FIG. 4A.

In some embodiments, training set generator 131 generates training data that includes one or more training inputs 401, and one or more target outputs 402. The training data can include mapping data that maps the training inputs 401 to the target outputs 402. Training inputs 401 can also be referred to as "features" or "attributes," herein. In some embodiments, training set generator 131 can provide the training data in a training set, and provide the training set to the training engine 141 (not illustrated) where the training set is used to train the model 160A. Generating a training set is further described with reference to FIG. 4B.

In some embodiments a target output 402 can be generated for each combination of training inputs 401. For example, and in some embodiments, for the training inputs 401 including consumer data 410 for a first consumer and external factor data 420 can generate a first set of target outputs 402. In another example, for the training inputs 401 including consumer data for a second consumer, the training set generator 131A can generate a second set of target outputs 402. In some embodiments, one or more training inputs can be paired with a target output.

Training Inputs

Training inputs 401 can include one or more of consumer data 410, or external factor data 420.

As described above, consumer data 410 can include one or more of information that describes the consumer or the employees thereof (e.g., organization data 411, or demographic data 412), or information derived from consumer activities (e.g., benefits usage data 413). An nth consumer data can be provided as an additional training input. In some embodiments, consumer data 410 includes one or more of organization data 411, demographic data 412, benefits usage data 413, or the like.

Organization data 411 can include information that describes the consumer. For example, and in some embodiments, organization data 411 can include one or more of location data, employee data, financial data, or consumer sector data, as described above with reference to FIG. 2B.

Demographic data 412 can include information that describes characteristics (e.g., demographic characteristics) of personnel associated with the consumer (e.g., employees of the consumer), as described above with reference to FIG. 2B.

Benefits usage data 413 can include information that describes a consumer's usage of products and/or services provided by a producer, as described above with reference to FIG. 2B.

Forecasted consumer data 414 can refer to information that estimates or predicts future outcomes, events, or trends related to the consumer, as described above with reference to FIG. 2B.

As described above, external factor data 420 can include information that reflects one or more factors or variables, such as events, influences, or conditions that can impact one or more of a consumer or a producer. In some embodiments, the events, influences, or conditions can be external events, external influences, or external conditions. In some embodiments, the external factor data 420 can include one or more of economic data 421, world and/or natural event data 422, forecasted external factor data 423, or the like.

Economic data 421 can include information regarding to micro- or macro-scale economic indicators that pertain to one or more of a consumer sector, a producer sector, a particular consumer, a particular producer, consumer-producer relationships, or a particular consumer-producer relationship, as described above with reference to FIG. 2B.

World and/or natural event data 422 (also referred to herein as "world event data") can include information regarding social, cultural, political, or naturally-occurring events that pertain to one or more of a consumer sector, a producer sector, a particular consumer, a particular producer, consumer-producer relationships, or a particular consumer-producer relationship, as described above with reference to FIG. 2B.

Target Outputs

Target outputs 402 can include consumer usage data 431. In some embodiments, the consumer usage data 431 can reflect a usage (e.g., historical usage) of a producer's product and/or services (e.g., benefits services) by the consumer.

In some embodiments, subsequent to or based on generating a training set and training the model 160A using the training set, the model 160A can be further trained (e.g., additional data for a training set) or adjusted (e.g., adjusting weights associated with input data of the model 160A, such as connection weights in a neural network). In some embodiments, the model 160A can be trained on additional training inputs (not illustrated) and additional target outputs (not illustrated).

Figure 4B:
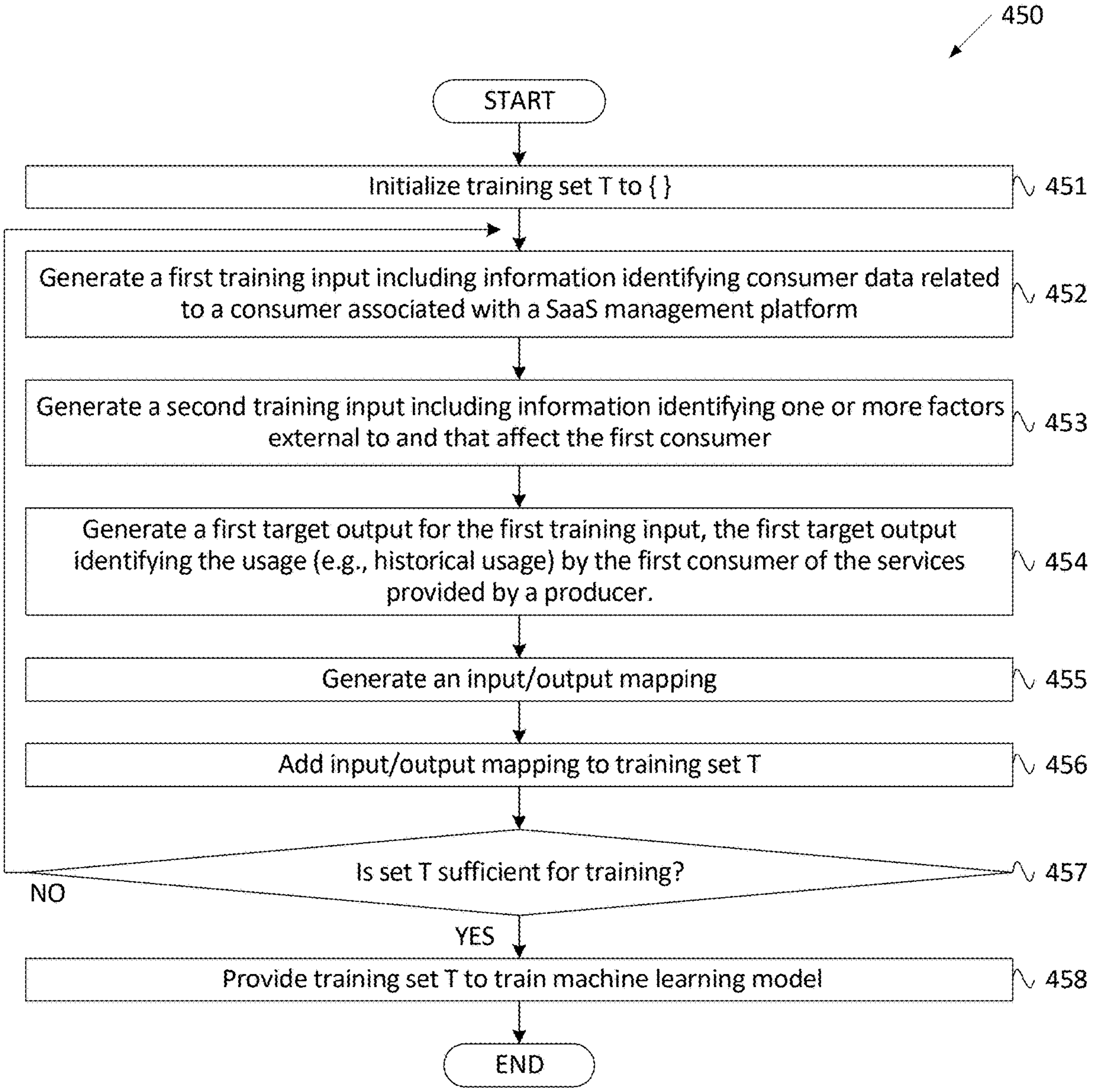
FIG. 4B depicts a flow diagram of one example of a method for training an AI model to generate consumer usage data, in accordance with some embodiments of the disclosure.

FIG. 4B depicts a flow diagram of one example of a method 450 for training an AI model to generate consumer usage data, in accordance with some embodiments of the disclosure. The method is performed by processing logic that can include hardware (circuitry, dedicated logic, etc.), software (e.g., instructions run on a processing device), or a combination thereof. In one embodiment, some or all the operations of method 450 can be performed by one or more components of system 100 of of FIG. 1. In other embodiments, one or more operations of method 450 can be performed by training set generator 131A of server machine 130 as described with reference to FIG. 1 through FIG. 2C. In some embodiments, one or more operations of method 450 can be performed by benefits module 151. It can be noted that components described with respect to FIG. 1 through FIG. 2C can be used to help illustrate elements of FIG. 4B. In some embodiments, the operations (e.g., operations 451-457) can be the same, different, fewer, or greater. For instance, in some embodiments one or more training inputs can be generated or one or more target outputs can be generated, and the one or more training inputs and one or more training outputs can be used as input-output pairs (for input) to train the AI model, such as model 160A, to be used by the benefits module 151.

Method 450 generates training data for an AI model. In some embodiments, at operation 451, processing logic implementing the method 450 initializes the training set "T" to an empty set (e.g., "{ }").

At operation 452, the processing logic generates a first training input including information identifying consumer data related to a consumer associated with a SaaS management platform.

At operation 453, the processing logic generates a second training input including information identifying one or more factors external to and that affect the first consumer.

At operation 454, the processing logic generates a first target output for the first training input, the first target output identifying the usage (e.g. historical usage) by the first consumer of the services provided by a producer. In some embodiments, the producer may have provided services to the consumer in the past.

At operation 455, processing logic optionally generates mapping data that is indicative of an input/output mapping. The input/output mapping (or training set mapping data) can refer to the training input (e.g., one or more of the training inputs described herein), the set of target outputs for the training input (e.g., one or more of the target outputs described herein), and an association between the training input(s) and the target output(s).

At operation 456, processing logic adds the mapping data generated at operation 456 to the training set T.

At operation 457, processing logic branches base on whether training set T is sufficient for training the model 160A. If so, execution proceeds to operation 457, otherwise, execution continues back at operation 452. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy satisfying a threshold, etc.) in addition to, or instead of, the number of input/output mappings.

At operation 458, processing logic provides training set T to train the AI model (e.g., model 160A). In one embodiment, training set T is provided to training engine 141 of server machine 140 to perform the training. In some embodiments, the operation 457 can include training the AI model using the training set T. In the case of a neural network, for example, input values of a given input/output mapping (e.g., numerical values associated with training inputs 401) are input to the neural network, and output values (e.g., numerical values associated with target outputs 402) of the input/output mapping are stored in the output nodes of the neural network. The connection weights in the neural network are then adjusted in accordance with a learning algorithm (e.g., back propagation, etc.), and the procedure is repeated for the other input/output mappings in training set T. At operation 457, the AI model (e.g., model 160A) can be trained using training engine 141 of server machine 140. The trained AI model (e.g., model 160A) can be implemented by the benefits module 151 (of server machine 150, or SaaS management platform 120) to identify consumer usage data for a consumer.

Figure 4C:
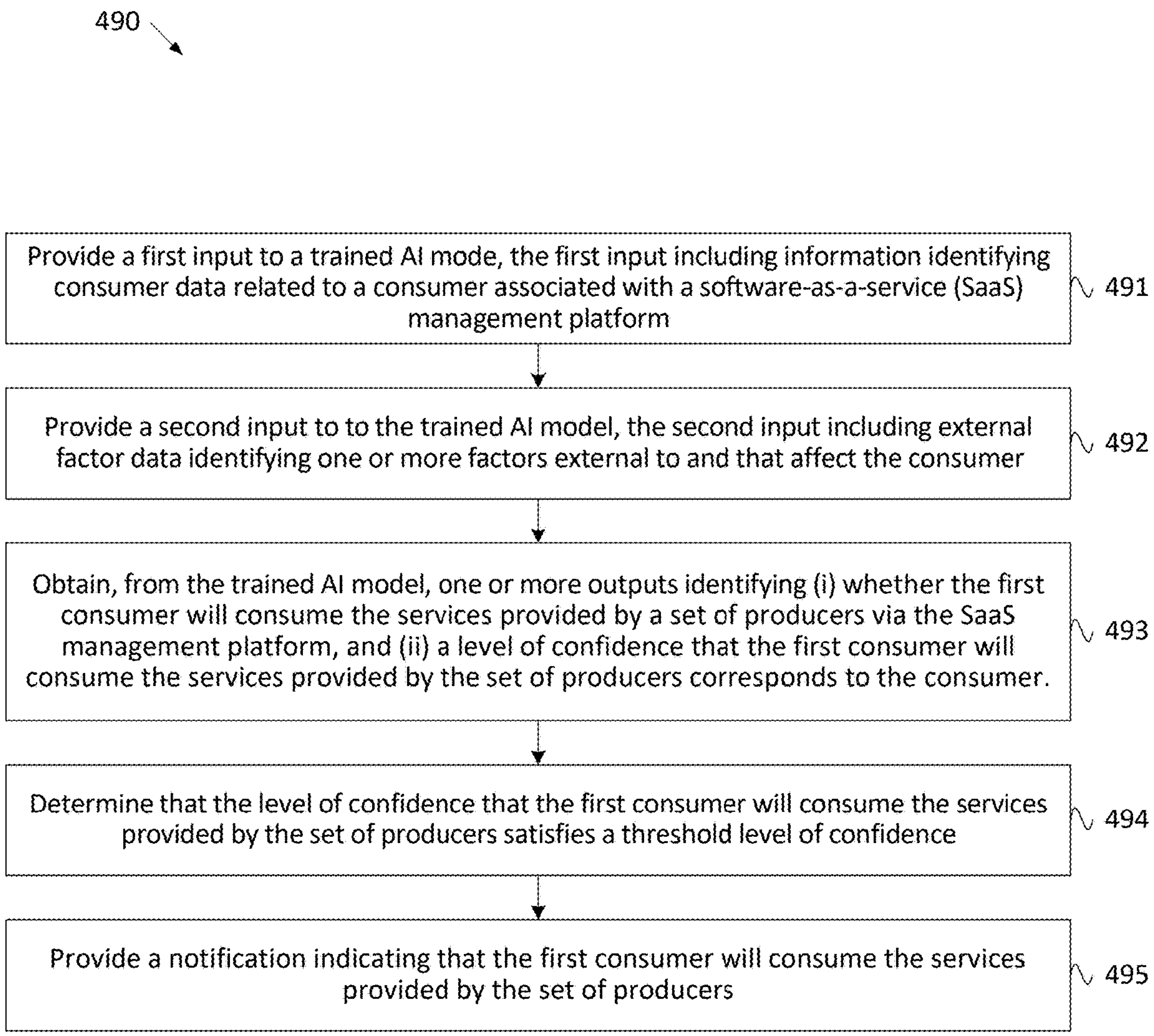
FIG. 4C depicts a flow diagram of one example of a method for using a trained AI model to generate consumer usage data, in accordance with some embodiments of the disclosure.

FIG. 4C depicts a flow diagram of one example of a method 490 for using a trained AI model to generate consumer usage data, in accordance with some embodiments of the disclosure. The method 490 is performed by processing logic that can include hardware (circuitry, dedicated logic, etc.), software (e.g., instructions run on a processing device), or a combination thereof. In one embodiment, some or all the operations of method 490 can be performed by one or more components of system 100 of FIG. 1, such as the benefits module 151. It can be noted that components described with reference to FIG. 1 can be used to illustrate elements of FIG. 4C. In some embodiments, the operations (e.g., operations 491-496) can be the same, different, fewer, or greater. In some embodiments, method 490 can use a trained AI model to generate consumer usage data based on one or more of consumer data, or external factor data.

At operation 491, the processing logic performing the method 490 provides a trained AI model a first input including information identifying consumer data related to a consumer associated with a software-as-a-service (SaaS) management platform.

At operation 492, the processing logic provides to the trained AI model a second input including external factor data identifying one or more factors external to and that affect the consumer.

At operation 493, the processing logic obtains from the trained AI model, one or more outputs. In some embodiments, the one or more outputs identify whether the first consumer will consume the services provided by a set of producers via the SaaS management platform. In some embodiments, the one or more outputs identify a level of confidence that the first consumer will consume the services provided by the set of producers corresponds to the consumer. In some embodiments, the likelihood that the that the first consumer will consume the services (e.g., use benefits) provided by each of the producers can include an estimate of an amount and/or type of services the first consumer will consume.

At operation 494, the processing logic determines that the level of confidence that that the first consumer will consume the services provided by the set of producers satisfies a threshold level of confidence. In some embodiments, processing logic determines the level of confidence of an amount and/or type of services the first consumer will consume.

At operation 495, the processing logic provides a notification indicating that the first consumer will consume the services provided by the set of producers. In some embodiments, the notification indicates an amount and/or type of services the first consumer will consume.

Figure 5A:
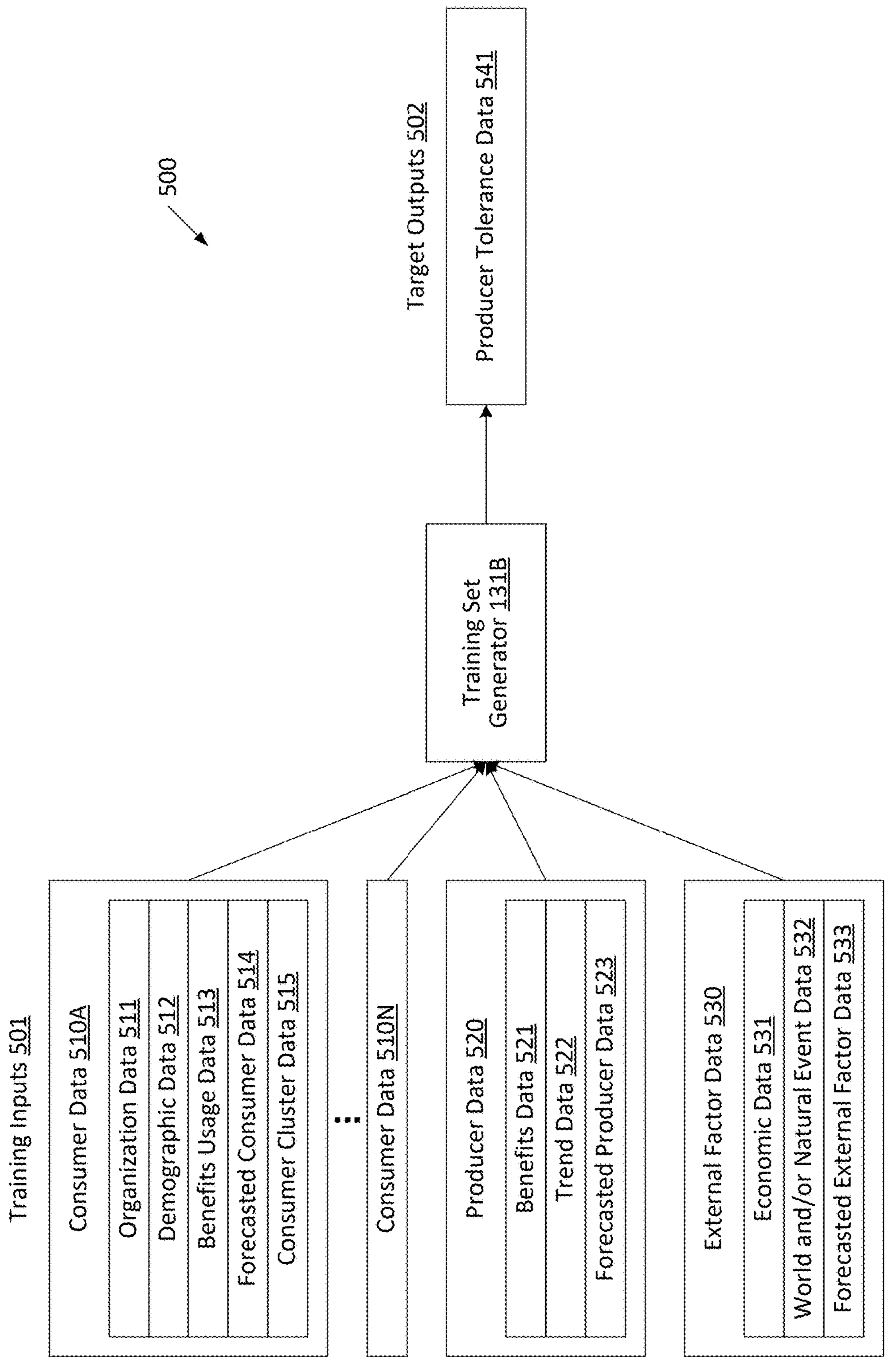
FIG. 5A is an example training set generator to generate training data for an AI model using information pertaining to one or more of consumer data and external factor data, in accordance with some embodiments of the disclosure.

FIG. 5A is an example training set generator to generate training data for an AI model using information pertaining to one or more of consumer data and external factor data, in accordance with some embodiments of the disclosure. System 500 shows a training set generator 131, training inputs 501, and target outputs 502. System 500 can include similar components as the system 100, as described in FIG. 1. Components described with reference to the system 100 of FIG. 1 can be used to describe the system 500 of FIG. 5A.

In some embodiments, training set generator 131 generates training data that includes one or more training inputs 501, and one or more target outputs 502. The training data can include mapping data that maps the training inputs 501 to the target outputs 502. Training inputs 501 can also be referred to as "features" or "attributes," herein. In some embodiments, training set generator 131 can provide the training data in a training set, and provide the training set to the training engine 141 (not illustrated) where the training set is used to train the model 160A. Generating a training set is further described with reference to FIG. 5B.

In some embodiments a target output 502 can be generated for each combination of training inputs 501. For example, and in some embodiments, for the training inputs 501 including consumer data 510A for a first consumer and external factor data 530 can generate a first set of target outputs 502. In another example, for the training inputs 501 including consumer data for a second consumer, the training set generator 131B can generate a second set of target outputs 502. In some embodiments, one or more training inputs can be paired with a target output.

Training Inputs

Training inputs 501 can include one or more of consumer data 510A, consumer data 510N, producer data 520, or external factor data 530.

As described above, consumer data 510A (and, respectively consumer data 510N) can include one or more of information that describes the consumer or the employees thereof (e.g., organization data 511, or demographic data 512), or information derived from consumer activities (e.g., benefits usage data 513). An nth consumer data 510N can be provided as an additional training input. In some embodiments, consumer data 510A includes one or more of organization data 511, demographic data 512, benefits usage data 513, or the like.

Organization data 511 can include information that describes the consumer. For example, and in some embodiments, organization data 511 can include one or more of location data, employee data, financial data, or consumer sector data, as described above with reference to FIG. 2B.

Demographic data 512 can include information that describes characteristics (e.g., demographic characteristics) of personnel associated with the consumer (e.g., employees of the consumer), as described above with reference to FIG. 2B.

Benefits usage data 513 can include information that describes a consumer's usage of products and/or services provided by a producer, as described above with reference to FIG. 2B.

Forecasted consumer data 514 can refer to information that estimates or predicts future outcomes, events, or trends related to a consumer, as described above with reference to FIG. 2B.

Consumer cluster data 515 can reflect data generated by clustering multiple consumers, as described above with reference to FIG. 1 and FIG. 2B.

As described above, producer data 520 can include one or more information that describes types of products and/or services provided by the producer (e.g., benefits data 521), information that describes cost trends (e.g., trend data 522), or the like. In some embodiments, producer data 520 includes one or more of benefits data 521, trend data 522, forecasted producer data 523, or the like.

Benefits data 521 can include information that describes the products and/or services provided by a producer, as described above with reference to FIG. 2B.

Trend data 522 can include information that describes trends with respect to a producer, as described above with reference to FIG. 2B.

Forecasted producer data 523 can refer to information that estimates or predicts future outcomes, events, or trends related to a producer, as described above with reference to FIG. 2B.

As described above, external factor data 530 can include information that reflects one or more factors or variables, such as events, influences, or conditions that can impact one or more of a consumer or a producer. In some embodiments, the events, influences, or conditions can be external events, external influences, or external conditions. In some embodiments, the external factor data 530 can include one or more of economic data 531, world and/or natural event data 532, forecasted external factor data 533, or the like.

Economic data 531 can include information regarding to micro- or macro-scale economic indicators that pertain to one or more of a consumer sector, a producer sector, a particular consumer, a particular producer, consumer-producer relationships, or a particular consumer-producer relationship, as described above with reference to FIG. 2B.

World and/or natural event data 532 (also referred to herein as "world event data") can include information regarding social, cultural, political, or naturally-occurring events that pertain to one or more of a consumer sector, a producer sector, a particular consumer, a particular producer, consumer-producer relationships, or a particular consumer-producer relationship, as described above with reference to FIG. 2B.

Forecasted external factor data 533 can refer to information that estimates or predict future outcomes, events, or trends related to factors external to one or more of the consumer or producer, as described above with reference to FIG. 2B.

Target Outputs

Target outputs 502 can include producer tolerance data 541. As described above with reference to FIG. 2B, producer tolerance data 541 can reflect whether a response from a producer of multiple producers to a request for services for a consumer will satisfy the consumer preferences of the consumer. In some embodiments, the producer tolerance data 541 can reflect whether responses from producers to requests for services for a consumer will satisfy the consumer preferences of the consumer.

In some embodiments, subsequent to or based on generating a training set and training the model 160A using the training set, the model 160A can be further trained (e.g., additional data for a training set) or adjusted (e.g., adjusting weights associated with input data of the model 160A, such as connection weights in a neural network). In some embodiments, the model 160A can be trained on additional training inputs (not illustrated) and additional target outputs (not illustrated).

Figure 5B:
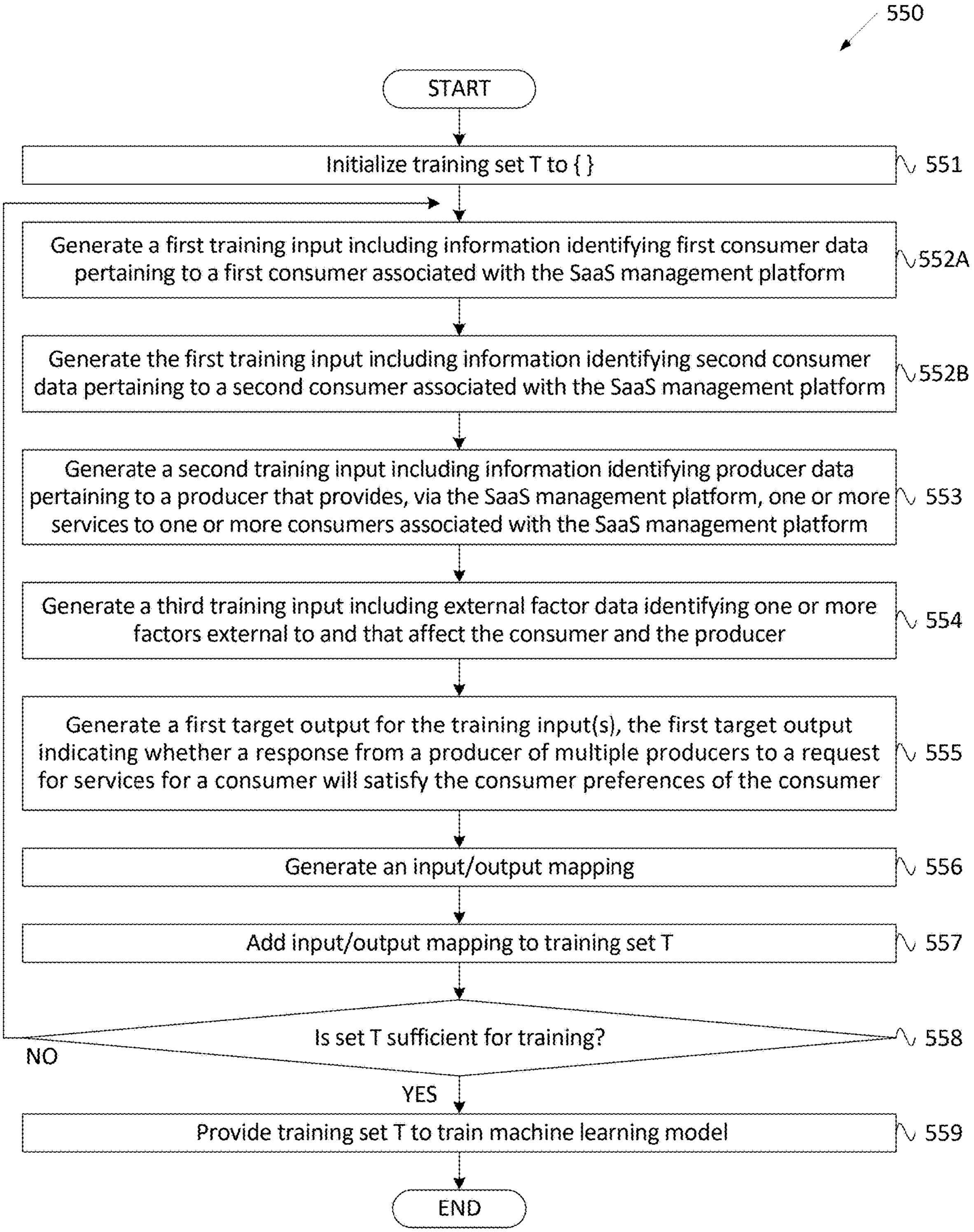
FIG. 5B depicts a flow diagram of one example of a method for training an AI model to generate producer tolerance data, in accordance with some embodiments of the disclosure.

FIG. 5B depicts a flow diagram of one example of a method 550 for training an AI model to generate producer tolerance data, in accordance with some embodiments of the disclosure. The method is performed by processing logic that can include hardware (circuitry, dedicated logic, etc.), software (e.g., instructions run on a processing device), or a combination thereof. In one embodiment, some or all the operations of method 550 can be performed by one or more components of system 100 of of FIG. 1. In other embodiments, one or more operations of method 550 can be performed by training set generator 131B of server machine 130 as described with reference to FIG. 1 through FIG. 2C. In some embodiments, one or more operations of method 550 can be performed by benefits module 151. It can be noted that components described with respect to FIG. 1 through FIG. 2C can be used to help illustrate elements of FIG. 5B. In some embodiments, the operations (e.g., operations 551-557) can be the same, different, fewer, or greater. For instance, in some embodiments one or more training inputs can be generated or one or more target outputs can be generated, and the one or more training inputs and one or more training outputs can be used as input-output pairs (for input) to train the AI model, such as model 160A, to be used by the benefits module 151.

Method 550 generates training data for an AI model. In some embodiments, at operation 551, processing logic implementing the method 550 initializes the training set "T" to an empty set (e.g., "{ }").

At operation 552A, the processing logic generates a first training input including information identifying first consumer data pertaining to a first consumer associated with a SaaS management platform.

At operation 552B, the processing logic generates a second training input including information identifying second consumer data pertaining to a second consumer associated with the SaaS management platform.

At operation 553, the processing logic generates a third training input including information identifying producer data pertaining to a producer that provides, via the SaaS management platform, one or more services to one or more consumers associated with the SaaS management platform.

At operation 554, the processing logic generates a fourth training input including external factor data identifying one or more factors external to and that affect the first consumer, the second consumer, or the producer.

At operation 555, the processing logic generates a first target output for the training input(s), the first target output indicating whether a response from a producer of multiple producers to a request for services for a consumer will satisfy the consumer preferences of the consumer. In some embodiments, the first target output can reflect whether responses from producers to requests for services for a consumer will satisfy the consumer preferences of the consumer.

At operation 556, processing logic optionally generates mapping data that is indicative of an input/output mapping. The input/output mapping (or training set mapping data) can refer to the training input (e.g., one or more of the training inputs described herein), the set of target outputs for the training input (e.g., one or more of the target outputs described herein), and an association between the training input(s) and the target output(s).

At operation 557, processing logic adds the mapping data generated at operation 556 to the training set T.

At operation 558, processing logic branches base on whether training set T is sufficient for training the model 160A. If so, execution proceeds to operation 559, otherwise, execution continues back at operation 552A. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy satisfying a threshold, etc.) in addition to, or instead of, the number of input/output mappings.

At operation 559, processing logic provides training set T to train the AI model (e.g., model 160A). In one embodiment, training set T is provided to training engine 141 of server machine 140 to perform the training. In some embodiments, the operation 557 can include training the AI model using the training set T. In the case of a neural network, for example, input values of a given input/output mapping (e.g., numerical values associated with training inputs 501) are input to the neural network, and output values (e.g., numerical values associated with target outputs 502) of the input/output mapping are stored in the output nodes of the neural network. The connection weights in the neural network are then adjusted in accordance with a learning algorithm (e.g., back propagation, etc.), and the procedure is repeated for the other input/output mappings in training set T. At operation 559, the AI model (e.g., model 160A) can be trained using training engine 141 of server machine 140. The trained AI model (e.g., model 160A) can be implemented by the benefits module 151 (of server machine 150, or SaaS management platform 120) to generate an estimate that a request for services will satisfy consumer preferences for a consumer.

Figure 5C:
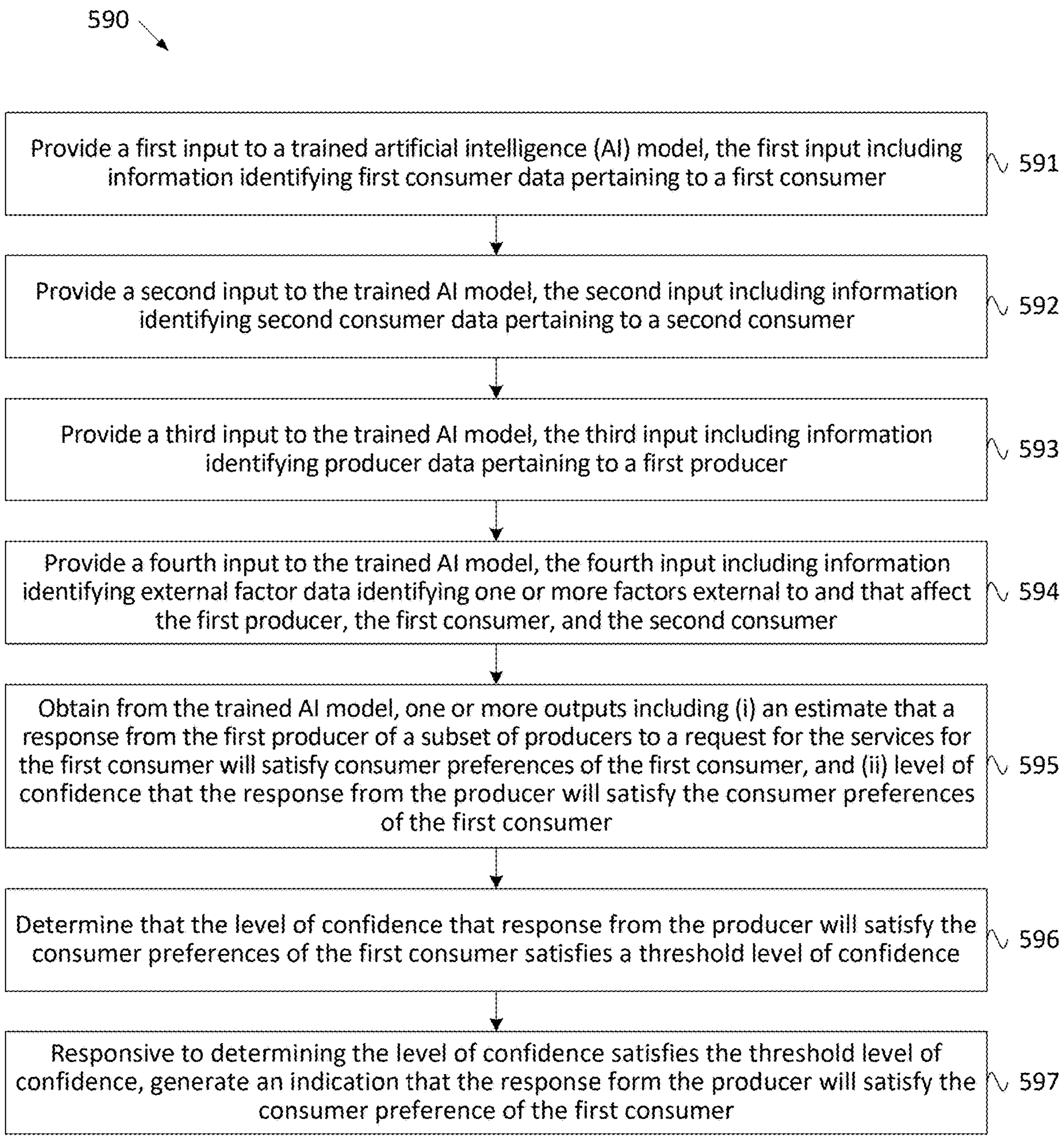
FIG. 5C depicts a flow diagram of one example of a method for using a trained AI model to generate consumer usage data, in accordance with some embodiments of the disclosure.

FIG. 5C depicts a flow diagram of one example of a method 590 for using a trained AI model to generate consumer usage data, in accordance with some embodiments of the disclosure. The method 590 is performed by processing logic that can include hardware (circuitry, dedicated logic, etc.), software (e.g., instructions run on a processing device), or a combination thereof. In one embodiment, some or all the operations of method 490 can be performed by one or more components of system 100 of FIG. 1, such as the benefits module 151. It can be noted that components described with reference to FIG. 1 can be used to illustrate elements of FIG. 5C. In some embodiments, the operations (e.g., operations 591-496) can be the same, different, fewer, or greater. In some embodiments, method 490 can use a trained AI model to generate consumer usage data based on one or more of consumer data, or external factor data.

At operation 591, the processing logic performing the method 590 provides a first input to the trained AI model. In some embodiments, the first input includes information identifying first consumer data pertaining to a first consumer.

At operation 592, the processing logic provides a second input to the trained AI model. In some embodiments, the second input includes information identifying second consumer data pertaining to a second consumer.

At operation 593, the processing logic provides a third input to the trained AI model. In some embodiments, the third input includes information identifying producer data pertaining to a first producer. In some embodiments, the producer data can include a subset of producers, as identified by input filters (e.g., input filters 211 of FIG. 2A).

At operation 594, the processing logic provides a fourth input to the trained AI model. In some embodiments, the fourth input includes information identifying external factor data identifying one or more factors external to and that affect the first producer, the first consumer, and the second consumer.

At operation 595, the processing logic obtains from the trained AI model, one or more outputs. In some embodiments, the one or more outputs include an estimate that a response from the first producer of a subset of producers to a request for the services for the first consumer will satisfy consumer preferences of the first consumer. In some embodiments, the one or more outputs include a level of confidence that the response from the producer will satisfy the consumer preferences of the first consumer.

At operation 596, the processing logic determines that the level of confidence that response from the producer will satisfy the consumer preferences of the first consumer satisfies a threshold level of confidence.

At operation 597, responsive to determining that the level of confidence satisfies the threshold level of confidence, the processing logic generates an indication that the response form the producer will satisfy the consumer preference of the first consumer.

Figure 6A:
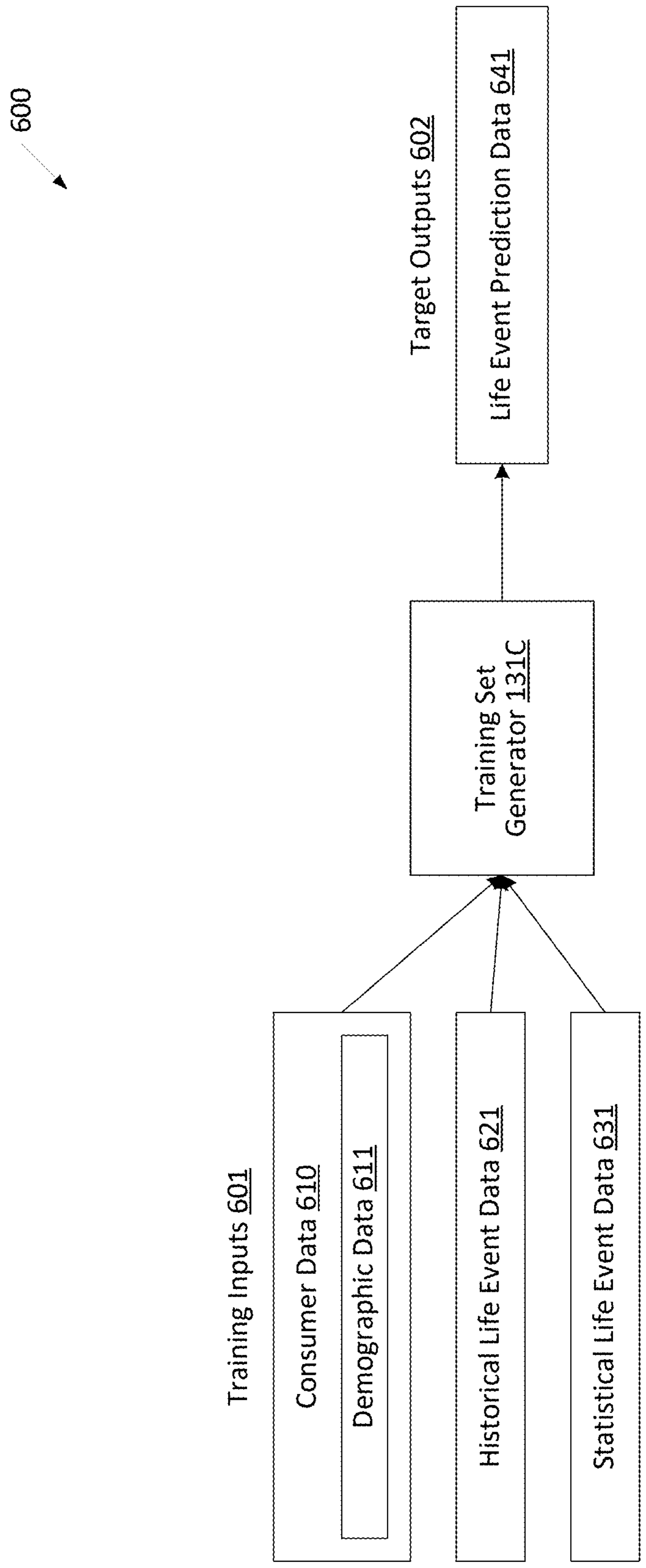
FIG. 6A is an example training set generator to generate training data for an AI model using information pertaining to one or more of consumer data, historical life event data, and statistical life event data, in accordance with some embodiments of the disclosure.

FIG. 6A is an example training set generator to generate training data for an AI model using information pertaining to one or more of consumer data, historical life event data, and statistical life event data, in accordance with some embodiments of the disclosure. System 600 shows a training set generator 131, training inputs 601, and target outputs 602. System 600 can include similar components as the system 100, as described in FIG. 1. Components described with reference to the system 100 of FIG. 1 can be used to describe the system 600 of FIG. 6A.

In some embodiments, training set generator 131C generates training data that includes one or more training inputs 601, and one or more target outputs 602. The training data can include mapping data that maps the training inputs 601 to the target outputs 602. Training inputs 601 can also be referred to as "features" or "attributes," herein. In some embodiments, training set generator 131 can provide the training data in a training set, and provide the training set to the training engine 141 (not illustrated) where the training set is used to train the model 160A. Generating a training set is further described with reference to FIG. 6B.

In some embodiments a target output 602 can be generated for each combination of training inputs 601. For example, and in some embodiments, for the training inputs 601 including consumer data 610 for a first consumer, historical life event data 621, and statistical live event data 631 can generate a first set of target outputs 602. In another example, for the training inputs 601 including consumer data for a second consumer, the training set generator 131C can generate a second set of target outputs 602. In some embodiments, one or more training inputs can be paired with a target output.

Training Inputs

Training inputs 601 can include one or more of consumer data 610, historical life event data 621, or statistical life event data 631.

As described above, consumer data 610 can include one or more of information that describes the consumer or the employees thereof (e.g., organization data, or demographic data 611), or information derived from consumer activities (e.g., benefits usage data). In some embodiments, consumer data 610 can include demographic data 611 or the like.

Demographic data 611 can include information that describes characteristics (e.g., demographic characteristics) of personnel associated with the consumer (e.g., employees of the consumer), as described above with reference to FIG. 2B.

Historical life event data 621 can include information that describes historical life events of employees of the consumer corresponding to the consumer data 610, as described above with reference to FIG. 2B.

Statistical life event data 631 can include information that describes life events for a population, as described above with reference to FIG. 2B.

Target Outputs

Target outputs 602 can include life event prediction data 641. In some embodiments, the life event prediction data 641 can indicate occurrences of employees' life events that have affected the services consumed by the consumer (e.g., by employees of the consumer).

In some embodiments, subsequent to or based on generating a training set and training the model 160A using the training set, the model 160A can be further trained (e.g., additional data for a training set) or adjusted (e.g., adjusting weights associated with input data of the model 160A, such as connection weights in a neural network). In some embodiments, the model 160A can be trained on additional training inputs (not illustrated) and additional target outputs (not illustrated).

Figure 6B:
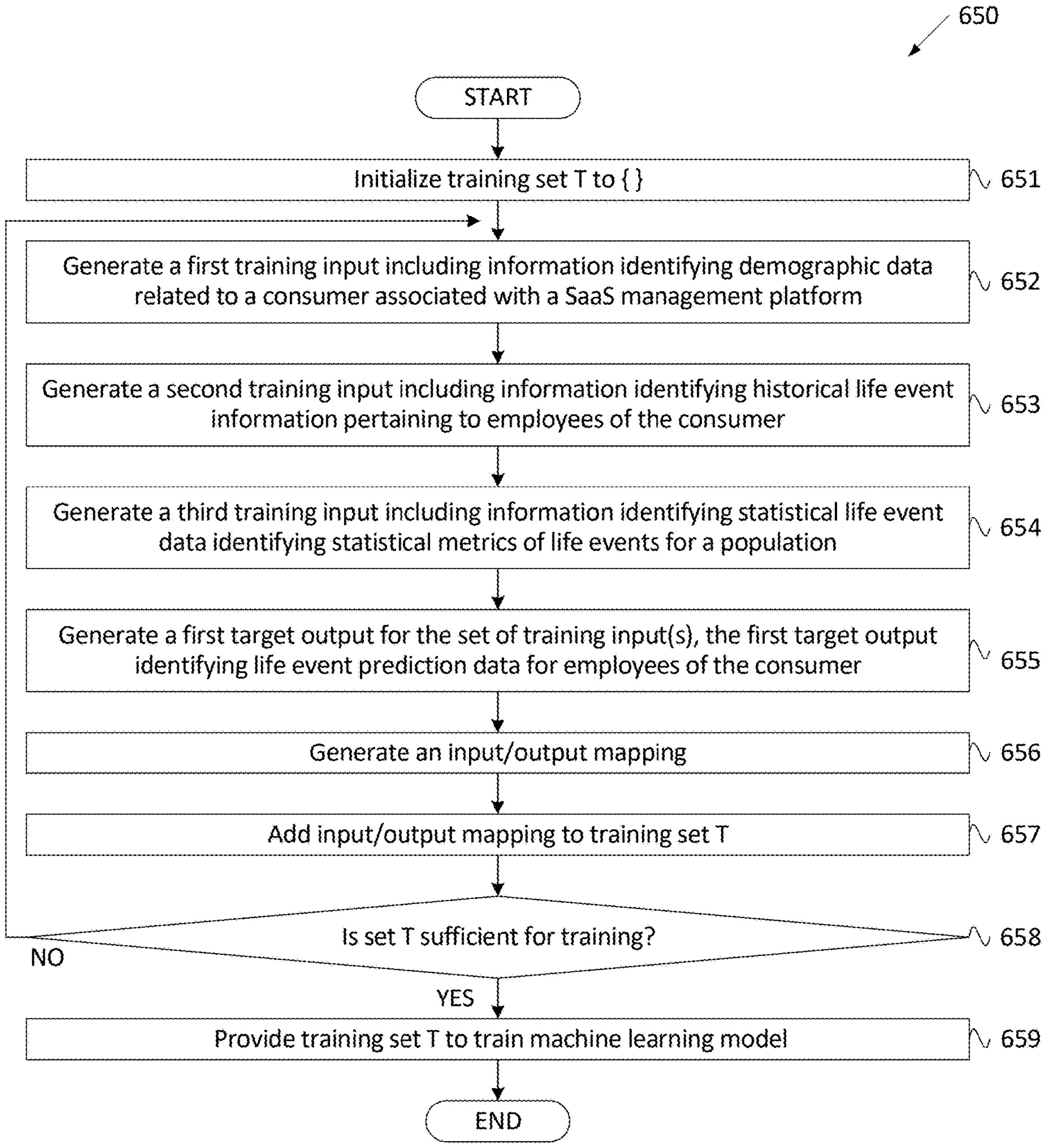
FIG. 6B depicts a flow diagram of one example of a method for training an AI model to generate consumer usage data, in accordance with some embodiments of the disclosure.
Figure 6C:
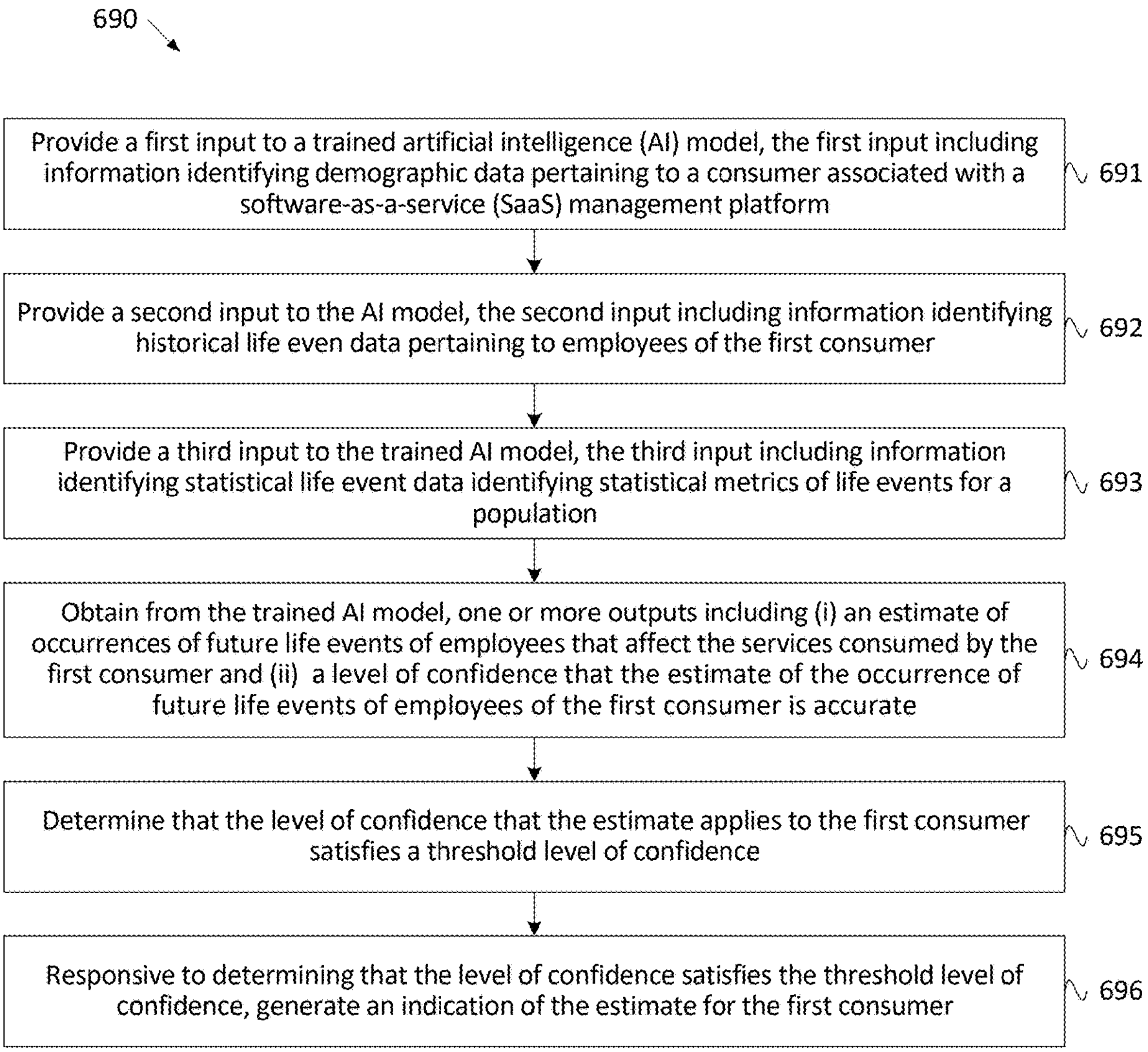
FIG. 6C depicts a flow diagram of one example of a method for using a trained AI model to generate consumer usage data, in accordance with some embodiments of the disclosure.

FIG. 6B depicts a flow diagram of one example of a method 650 for training an AI model to generate consumer usage data, in accordance with some embodiments of the disclosure. The method is performed by processing logic that can include hardware (circuitry, dedicated logic, etc.), software (e.g., instructions run on a processing device), or a combination thereof. In one embodiment, some or all the operations of method 650 can be performed by one or more components of system 100 of of FIG. 1. In other embodiments, one or more operations of method 650 can be performed by training set generator 131 of server machine 130 as described with reference to FIG. 1 through FIG. 2C. In some embodiments, one or more operations of method 650 can be performed by benefits module 151. It can be noted that components described with respect to FIG. 1 through FIG. 2C can be used to help illustrate elements of FIG. 6B. In some embodiments, the operations (e.g., operations 651-657) can be the same, different, fewer, or greater. For instance, in some embodiments one or more training inputs can be generated or one or more target outputs can be generated, and the one or more training inputs and one or more training outputs can be used as input-output pairs (for input) to train the AI model, such as model 160A, to be used by the benefits module 151.

Method 650 generates training data for an AI model. In some embodiments, at operation 651, processing logic implementing the method 650 initializes the training set "T" to an empty set (e.g., "{ }").

At operation 652, the processing logic generates a first training input including information identifying demographic data related to a consumer associated with a SaaS management platform.

At operation 653, the processing logic generates a second training input including information identifying historical life event information pertaining to employees of the consumer.

At operation 654, the processing logic generates a third training input including information identifying statistical metrics of life events data identifying statistical metrics of life events for a population.

At operation 655, the processing logic generates a first target output for the set of training input(s), the first target output identifying life event prediction data for employees of the consumer. In some embodiments, the life event prediction data can indicate occurrences of employees' life events that have affected the services consumed by the consumer (e.g., by employees of the consumer). In some embodiments, the life event prediction data can indicate whether the employees have had a qualifying life event within a time period. In some embodiments, the live event prediction data can indicate the type of life event.

At operation 656, processing logic optionally generates mapping data that is indicative of an input/output mapping. The input/output mapping (or training set mapping data) can refer to the training input (e.g., one or more of the training inputs described herein), the set of target outputs for the training input (e.g., one or more of the target outputs described herein), and an association between the training input(s) and the target output(s).

At operation 657, processing logic adds the mapping data generated at operation 656 to the training set T.

At operation 658, processing logic branches base on whether training set T is sufficient for training the model 160A. If so, execution proceeds to operation 659, otherwise, execution continues back at operation 652. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy satisfying a threshold, etc.) in addition to, or instead of, the number of input/output mappings.

At operation 659, processing logic provides training set T to train the AI model (e.g., model 160A). In one embodiment, training set T is provided to training engine 141 of server machine 140 to perform the training. In some embodiments, the operation 659 can include training the AI model using the training set T. In the case of a neural network, for example, input values of a given input/output mapping (e.g., numerical values associated with training inputs 601) are input to the neural network, and output values (e.g., numerical values associated with target outputs 602) of the input/output mapping are stored in the output nodes of the neural network. The connection weights in the neural network are then adjusted in accordance with a learning algorithm (e.g., back propagation, etc.), and the procedure is repeated for the other input/output mappings in training set T. At operation 659, the AI model (e.g., model 160A) can be trained using training engine 141 of server machine 140. The trained AI model (e.g., model 160A) can be implemented by the benefits module 151 (of server machine 150, or SaaS management platform 120) to identify consumer usage data for a consumer.

FIG. 46C depicts a flow diagram of one example of a method 690 for using a trained AI model to generate consumer usage data, in accordance with some embodiments of the disclosure. The method 690 is performed by processing logic that can include hardware (circuitry, dedicated logic, etc.), software (e.g., instructions run on a processing device), or a combination thereof. In one embodiment, some or all the operations of method 690 can be performed by one or more components of system 100 of FIG. 1, such as the benefits module 151. It can be noted that components described with reference to FIG. 1 can be used to illustrate elements of FIG. 6C. In some embodiments, the operations (e.g., operations 691-696) can be the same, different, fewer, or greater. In some embodiments, method 690 can use a trained AI model to generate consumer usage data based on one or more of consumer data, or external factor data.

At operation 691, the processing logic performing the method 690 provide a first input to a trained artificial intelligence (AI) model. In some embodiments, the first input including information identifying demographic data pertaining to a consumer associated with a SaaS management platform.

At operation 692, the processing logic provides a second input to the AI model. In some embodiments, the second input including information identifying historical life even data pertaining to employees of the first consumer.

At operation 693, the processing logic provides a third input to the trained AI model. In some embodiments, the third input including information identifying statistical life event data identifying statistical metrics of life events for a population.

At operation 694, the processing logic obtains from the trained AI model, one or more outputs. In some embodiments, the one or more outputs include an estimate of occurrences of future life events of employees that affect the services consumed by the first consumer. In some embodiments, the one or more outputs include a level of confidence that the estimate of the occurrence of future life events of employees of the first consumer is accurate.

At operation 695, the processing logic determines that the level of confidence that the estimate applies to the first consumer satisfies a threshold level of confidence.

At operation 696, responsive to determining that the level of confidence satisfies the threshold level of confidence, the processing logic generates an indication of the estimate for the first consumer.

Figure 7:
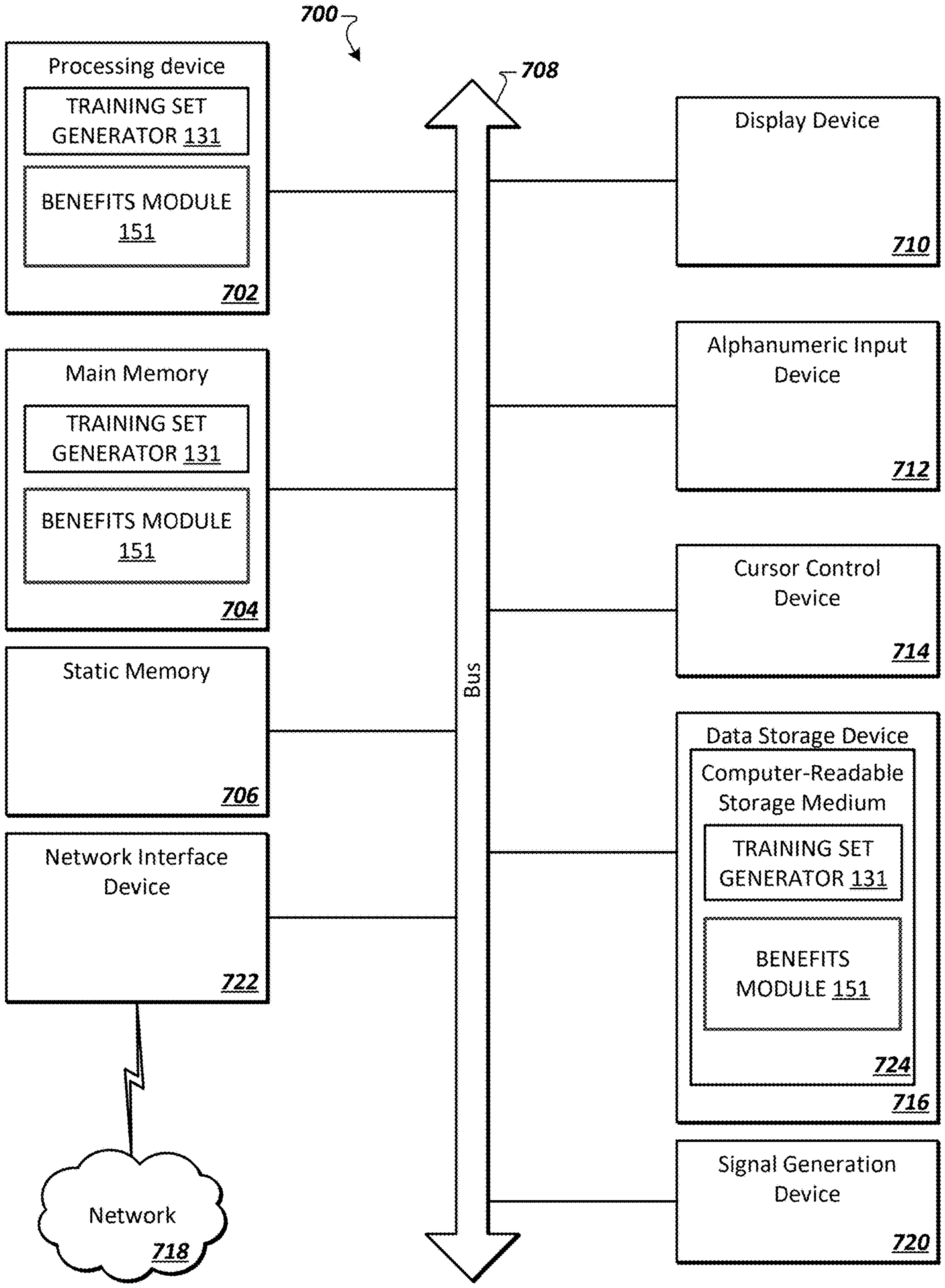
FIG. 7 is a block diagram illustrating an exemplary computer system, in accordance with some embodiments of the disclosure.

FIG. 7 is a block diagram illustrating an exemplary computer system, system 700, in accordance with some embodiments of the disclosure. The system 700 executes one or more sets of instructions that cause the machine to perform any one or more of the methodologies discussed herein. Set of instructions, instructions, and the like can refer to instructions that, when executed system 700, cause the system 700 to perform one or more operations of training set generator 131 or the benefits module 151. The machine can operate in the capacity of a server or a client device in client-server network environment, or as a peer machine in a peer-to-peer (or distributed) network environment. The machine can be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 708.

The processing device 702 represents one or more general-purpose processing devices such as a microprocessor, central processing unit, or the like. More particularly, the processing device 702 can be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute instructions of the system 100 and the training set generator 131 or the benefits module 151 for performing the operations discussed herein.

The system 700 can further include a network interface device 722 that provides communication with other machines over a network 718, such as a local area network (LAN), an intranet, an extranet, or the internet. The system 700 also can include a display device 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 can include a computer-readable storage medium 724 on which is stored the sets of instructions of the system 100 and of training set generator 131 or of the benefits module 151 embodying any one or more of the methodologies or functions described herein. The computer-readable storage medium 724 can be a non-transitory computer-readable storage medium. The sets of instructions of the system 100 and of training set generator 131 or of the benefits module 151 can also reside, completely or at least partially, within the main memory 704 and/or within the processing device 702 during execution thereof by the system 700, the main memory 704 and the processing device 702 also constituting computer-readable storage media. The sets of instructions can further be transmitted or received over the network 718 via the network interface device 722.

While the example of the computer-readable storage medium 724 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding, or carrying a set of instructions for execution by the machine and that cause the machine to perform any one or more of the methodologies of the disclosure. The term "computer-readable storage medium" can include, but not be limited to, solid-state memories, optical media, and magnetic media. For example, the term "computer-readable storage medium" can include a non-transitory computer readable storage medium.

In the foregoing description, numerous details are set forth. It will be apparent, however, to one of ordinary skill in the art having the benefit of this disclosure, that the disclosure can be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating," "providing," "obtaining," "identifying," "determining," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus can be specially constructed for the required purposes, or it can include a general purpose computer selectively activated or reconfigured by a computer program stored in the computer. Such a computer program can be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims can generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and cannot necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure can, therefore, be determined with reference to the appended claims, along with the full scope of equivalents to which such claims are entitled.

What is claimed is:

1. A method comprising:

identifying, from among a plurality of third-party service providers, a subset of third-party service providers to provide services to a first client organization, wherein one or more services provided by the subset of third-party service providers are to be facilitated via a software-as-a-service (SaaS) management platform;

identifying, by one or more processing devices, a set of weights for a ranking model configured to generate scores indicating a likelihood that respective services provided by a respective third-party service provider of the subset of third-party service providers are a match for the first client organization, wherein a value of each weight of the set of weights reflects an output value from a respective artificial intelligence (AI) model of a plurality of AI models;

providing a first input to a first trained AI model, the first input comprising first consumer data comprising demographic data that identifies i) an age of each of a plurality of employees associated with the first client organization, and ii) a family status of each of the plurality of employees associated with the first client organization;

generating, by the first trained AI model in response to the first input, a first output indicating, for each of the subset of third-party service providers, a likelihood that the plurality of employees will consume the one or more services provided by the subset of third-party service providers;

responsive to generating the first output indicating the likelihood that the plurality of employees will consume the one or more services, adjusting a first value of a first weight of the set of weights using a second value that is derived from the first output of the first trained AI model to generate an adjusted set of weights, wherein adjusting the first value of the first weight to generate the adjusted set of weights is performed to improve an accuracy of the ranking model to estimate a likelihood that the subset of third-party service providers is able to provide the one or more services to the first client organization;

providing a second input to the ranking model, the second input comprising second consumer data comprising consumer preference data indicating criteria for the one or more services provided by the subset of third-party service providers and identified by the first client organization;

generating, by the ranking model, a set of scores for each of the subset of third-party service providers using the adjusted set of weights as parameters to the ranking model, each score of the set of scores indicating the likelihood that the respective services provided by the respective third-party service provider of the subset of third-party service providers are suitable for the first client organization;

responsive to determining that a first score of the set of scores satisfies a threshold score, selecting, among the subset of third-party service providers, a first third-party service provider as suitable for the first client organization; and providing, to an agent device associated with the SaaS management platform, a notification indicating that the first third-party service provider is suitable for the first client organization.

2. The method of claim 1, wherein identifying, from among the plurality of third-party service providers, the subset of third-party service providers is based on one or more criteria related to characteristics of the first client organization and characteristics of the plurality of third-party service providers that provide, via the SaaS management platform, the one or more services.

3. The method of claim 1, further comprising:

providing an additional input to the first trained AI model, the additional input comprising additional consumer preference data related to the first client organization.

4. The method of claim 1, further comprising:

generating by a second trained AI model, a second output indicating an estimate that a response from the first third-party service provider to a request for the services for the first client organization will satisfy preferences of the first client organization; and updating, by the one or more processing devices, the ranking model by adjusting a second weight of the adjusted set of weights to generate a second adjusted set of weights based on the second output of the second trained AI model.

5. The method of claim 4, further comprising:

providing a third input to the second trained AI model, the third input comprising:

third consumer data pertaining to the first client organization, fourth consumer data pertaining to a second client organization, producer data pertaining to the first third-party service provider, and external factor data identifying one or more factors external to and that affect the first third-party service provider, the first client organization, and the second client organization.

6. The method of claim 1, further comprising:

generating, by a third trained AI model, a third output indicating an estimate of occurrences of future life events of the plurality of employees that affect the services consumed by the first client organization; and updating, by the one or more processing devices, the ranking model by adjusting a third weight of the adjusted set of weights to generate a third adjusted set of weights based on the third output of the third trained AI model.

7. The method of claim 6, further comprising:

providing a third input to the third trained AI model, the third input comprising:

demographic data related to the first client organization, historical life event data pertaining to employees of the first client organization, and statistical life event data identifying statistical metrics of life events for a population.

8. The method of claim 1, wherein the second consumer data comprises at least a portion of the first consumer data.

9. The method of claim 1, further comprising:

generating first training data for further training the first trained AI model, the first training data comprising a first training input and a first training output, wherein the first training input comprises the first input, and the first training output comprises the first output.

10. A system comprising: a memory; and one or more processing devices coupled to the memory, the one or more processing devices configured to perform operations comprising:

identifying, from among a plurality of third-party service providers, a subset of third-party service providers to provide services to a first client organization, wherein one or more services provided by the subset of third-party service providers are to be facilitated via a software-as-a-service (SaaS) management platform;

identifying, by the one or more processing devices, a set of weights for a ranking model configured to generate scores indicating a likelihood that respective services provided by a respective third-party service provider of the subset of third-party service providers are a match for the first client organization, wherein a value of each weight of the set of weights reflects an output value from a respective artificial intelligence (AI) model of a plurality of AI models;

providing a first input to a first trained AI model, the first input comprising first consumer data comprising demographic data that identifies i) an age of each of a plurality of employees associated with the first client organization, and ii) a family status of each of the plurality of employees associated with the first client organization;

generating, by the first trained AI model in response to the first input, a first output indicating, for each of the subset of third-party service providers, a likelihood that the plurality of employees will consume the one or more services provided by the subset of third-party service providers;

responsive to generating the first output indicating the likelihood that the plurality of employees will consume the one or more services, adjusting a first value of a first weight of the set of weights using a second value that is derived from the first output of the first trained AI model to generate an adjusted set of weights, wherein adjusting the first value of the first weight to generate the adjusted set of weights is performed to improve an accuracy of the ranking model to estimate a likelihood that the subset of third-party service providers is able to provide the one or more services to the first client organization;

providing a second input to the ranking model, the second input comprising second consumer data comprising consumer preference data indicating criteria for the one or more services provided by the subset of third-party service providers and identified by the first client organization;

generating, by the ranking model, a set of scores for each of the subset of third-party service providers using the adjusted set of weights as parameters to the ranking model, each score of the set of scores indicating the likelihood that the respective services provided by the respective third-party service provider of the subset of third-party service providers are suitable for the first client organization;

responsive to determining that a first score of the set of scores satisfies a threshold score, selecting, among the subset of third-party service providers, a first third-party service provider as suitable for the first client organization; and providing, to an agent device associated with the SaaS management platform, a notification indicating that the first third-party service provider is suitable for the first client organization.

11. The system of claim 10, wherein identifying, from among the plurality of third-party service providers, the subset of third-party service providers is based on one or more criteria related to characteristics of the first client organization and characteristics of the plurality of third-party service providers that provide, via the SaaS management platform, the one or more services.

12. The system of claim 10, the operations further comprising:

providing an additional input to the first trained AI model, the additional input comprising additional consumer preference data related to the first client organization.

13. The system of claim 10, the operations further comprising:

generating by a second trained AI model, a second output indicating an estimate that a response from the first third-party service provider to a request for the services for the first client organization will satisfy preferences of the first client organization.

14. The system of claim 13, the operations further comprising:

providing a third input to the second trained AI model, the third input comprising:

third consumer data pertaining to the first client organization, fourth consumer data pertaining to a second client organization, producer data pertaining to the first third-party service provider, and external factor data identifying one or more factors external to and that affect the first third-party service provider, the first client organization, and the second client organization.

15. The system of claim 10, the operations further comprising:

generating by a third trained AI model, a third output indicating an estimate of occurrences of future life events of the plurality of employees that affect the services consumed by the first client organization.

16. The system of claim 15, the operations further comprising:

providing a third input to the third trained AI model, the third input comprising:

demographic data related to the first client organization, historical life event data pertaining to employees of the first client organization, and statistical life event data identifying statistical metrics of life events for a population.

17. A non-transitory computer-readable storage medium comprising instructions that, responsive to execution by one or more processing devices, cause the one or more processing devices to perform operations comprising:

identifying, from among a plurality of third-party service providers, a subset of third-party service providers to provide services to a first client organization, wherein one or more services provided by the subset of third-party service providers are to be facilitated via a software-as-a-service (SaaS) management platform;

identifying, by the one or more processing devices, a set of weights for a ranking model configured to generate scores indicating a likelihood that respective services provided by a respective third-party service provider of the subset of third-party service providers are a match for the first client organization, wherein a value of each weight of the set of weights reflects an output value from a respective artificial intelligence (AI) model of a plurality of AI models;

providing a first input to a first trained AI model, the first input comprising first consumer data comprising demographic data that identifies i) an age of each of a plurality of employees associated with the first client organization, and ii) a family status of each of the plurality of employees associated with the first client organization;

generating, by the first trained AI model in response to the first input, a first output indicating, for each of the subset of third-party service providers, a likelihood that the plurality of employees will consume the one or more services provided by the subset of third-party service providers;

responsive to generating the first output indicating the likelihood that the plurality of employees will consume the one or more services, adjusting a first value of a first weight of the set of weights using a second value that is derived from the first output of the first trained AI model to generate an adjusted set of weights, wherein adjusting the first value of the first weight to generate the adjusted set of weights is performed to improve an accuracy of the ranking model to estimate a likelihood that the subset of third-party service providers is able to provide the one or more services to the first client organization;

providing a second input to the ranking model, the second input comprising second consumer data comprising consumer preference data indicating criteria for the one or more services provided by the subset of third-party service providers and identified by the first client organization;

generating, by the ranking model, a set of scores for each of the subset of third-party service providers using the adjusted set of weights as parameters to the ranking model, each score of the set of scores indicating the likelihood that the respective services provided by the respective third-party service provider of the subset of third-party service providers are suitable for the first client organization;

responsive to determining that a first score of the set of scores satisfies a threshold score, selecting, among the subset of third-party service providers, a first third-party service provider as suitable for the first client organization; and providing, to an agent device associated with the SaaS management platform, a notification indicating that the first third-party service provider is suitable for the first client organization.

18. The non-transitory computer-readable storage medium of claim 17, wherein identifying, from among the plurality of third-party service providers, the subset of third-party service providers is based on one or more criteria related to characteristics of the first client organization and characteristics of the plurality of third-party service providers that provide, via the SaaS management platform, the one or more services.

19. The non-transitory computer-readable storage medium of claim 17, the operations further comprising:

generating by a second trained AI model, a second output indicating an estimate that a response from the first third-party service provider to a request for the services for the first client organization will satisfy preferences of the first client organization.

20. The non-transitory computer-readable storage medium of claim 19, the operations further comprising:

providing a third input to the second trained AI model, the third input comprising:

third consumer data pertaining to the first client organization, fourth consumer data pertaining to a second client organization, producer data pertaining to the first third-party service provider, and external factor data identifying one or more factors external to and that affect the first third-party service provider, the first client organization, and the second client organization.

21. The non-transitory computer-readable storage medium of claim 17, the operations further comprising:

generating by a third trained AI model, a third output indicating an estimate of occurrences of future life events of the plurality of employees that affect the services consumed by the first client organization.

22. The non-transitory computer-readable storage medium of claim 21, the operations further comprising:

providing a third input to the third trained AI model, the third input comprising:

demographic data related to the first client organization, historical life event data pertaining to employees of the first client organization, and statistical life event data identifying statistical metrics of life events for a population.

* * * * *